US012749359B2

(12) United States Patent
Komiyama et al.

(10) Patent No.: US 12,749,359 B2
(45) Date of Patent: Sep. 29, 2026

(54) MOBILITY SERVICE BASE SERVER, MOBILITY SERVICE PROVIDING SYSTEM, VEHICLE ACCESS CONTROL METHOD, AND STORAGE MEDIUM

(71) Applicant: DENSO CORPORATION, Kariya-city (JP)

(72) Inventors: Masatoshi Komiyama, Kariya-city (JP); Kensho Taki, Kariya-city (JP); Lingfei Xie, Kariya-city (JP); Shigeru Kajioka, Kariya-city (JP); Makiko Tauchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 205 days.

(21) Appl. No.: 18/397,821

(22) Filed: Dec. 27, 2023

(65) Prior Publication Data

US 2024/0127647 A1 Apr. 18, 2024

Related U.S. Application Data

(63) Continuation of application No. PCT/JP2022/025810, filed on Jun. 28, 2022.

(30) Foreign Application Priority Data

Jul. 2, 2021 (JP) ................................. 2021-110903

(51) Int. Cl.
*G07C 9/00* (2020.01)
*H04W 4/40* (2018.01)

(52) U.S. Cl.
CPC .......... *G07C 9/00309* (2013.01); *H04W 4/40* (2018.02)

(58) Field of Classification Search
None
See application file for complete search history.

(56) References Cited

U.S. PATENT DOCUMENTS 5,748,843 A * 5/1998 Peck .................... G05B 19/042 704/231
2006/0052159 A1* 3/2006 Cahill ..................... G07F 17/32 463/27
(Continued)

FOREIGN PATENT DOCUMENTS

CN 110201334 A 9/2019
CN 210152787 U 3/2020
(Continued)

OTHER PUBLICATIONS

U.S. Appl. No. 18/397,685, filed Dec. 27, 2023, Komiyama et al.

*Primary Examiner* — Carlos Garcia
(74) *Attorney, Agent, or Firm* — Harness, Dickey & Pierce, P.L.C.

(57) ABSTRACT

A mobility service base server includes a vehicle-side unit and a service-side unit. The vehicle-side unit includes a vehicle control unit configured to execute access to a target vehicle, the target vehicle being a vehicle to be accessed, by performing wireless communication with the in-vehicle device mounted on the target vehicle when the interface unit receives the access request for the vehicle. The vehicle control unit is configured to execute relay control in response to a control instruction transmitted to and received from the in-vehicle device.

9 Claims, 30 Drawing Sheets

(56) References Cited

U.S. PATENT DOCUMENTS

| | | | | |
|---|---|---|---|---|
| 2008/0164972 | A1 | 7/2008 | Taki et al. | |
| 2013/0083679 | A1 | 4/2013 | Krishnaswamy et al. | |
| 2015/0057840 | A1* | 2/2015 | Katou | B60R 25/102 701/2 |
| 2016/0282127 | A1 | 9/2016 | Goto et al. | |
| 2019/0266295 | A1 | 8/2019 | Masuda et al. | |
| 2021/0400242 | A1* | 12/2021 | Cui | G06V 40/25 |
| 2022/0306226 | A1* | 9/2022 | Miller | B62H 5/14 |
| 2024/0127646 | A1 | 4/2024 | Komiyama et al. | |

FOREIGN PATENT DOCUMENTS

| | | | | |
|---|---|---|---|---|
| JP | 2006088829 | A | | 4/2006 |
| JP | 2010-226754 | A | | 10/2010 |
| JP | 2015501464 | A | | 1/2015 |
| JP | 2016180980 | A | | 10/2016 |
| JP | 2019153291 | A | | 9/2019 |
| JP | 2020-190893 | A | | 11/2020 |
| JP | 2021019276 | A | * | 2/2021 |

* cited by examiner

FIG. 5

23a

| CANID | ECU | POSITION | DLC | UNIQUE LABEL | RESOLUTION | OFFSET | UNIT |
|---|---|---|---|---|---|---|---|
| 0x123 | ENG | 2.0 | 8 | ETHA | 1 | 0 | °C |
| 0x123 | ENG | 3.0 | 16 | NE1 | 0.78 | 0 | rpm |

<STEERING ANGLE> = SSA (STEERING MOVEMENT ANGLE) - SSAZ (STEERING ZERO POINT)

DATA FORMAT

| UNIQUE LABEL | ECU | DATA | | | |
|---|---|---|---|---|---|
| | | MOLD | SIZE | VALUE | UNIT |
| ETHA | ENG | float | 4byte | 25.0 | °C |
| NE1 | ENG | float | 4byte | 3000 | rpm |
| ... | | | | | |

FIG. 13

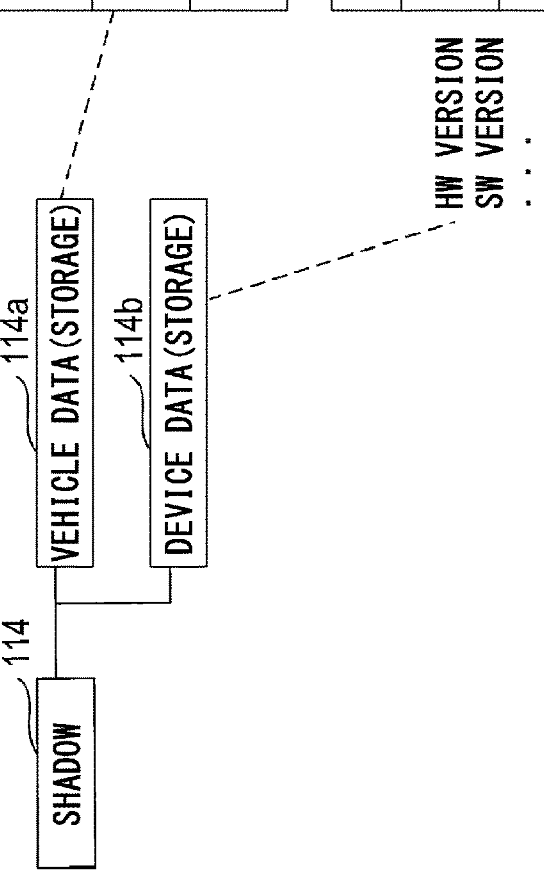

| PHYSICAL NAME | ITEM NAME | DATA TYPE |
|---|---|---|
| object-id | OBJECT ID | CHARACTER STRING |
| Shadow_version | SHADOW VERSION | NUMERICAL VALUE |
| mobility-data | DATA DEFINITION | CHARACTER STRING |

| PHYSICAL NAME | ITEM NAME | DATA TYPE |
|---|---|---|
| object-id | OBJECT ID | CHARACTER STRING |
| update_time | UPDATE TIME | NUMERICAL VALUE |
| version | VERSION | CHARACTER STRING |
| power_status | SYSTEM STATE | CHARACTER STRING |
| power_status_timestamp | SYSTEM STATE NOTIFICATION TIMESTAMP | NUMERICAL VALUE |
| notify_reason | REASON FOR RESULT | CHARACTER STRING |

FIG. 14

118

| ITEM NAME | DATA OVERVIEW |
|---|---|
| gateway-id | GATEWAY ID |
| object-id | OBJECT ID |
| shadow-version | SHADOW VERSION |
| vin | VEHICLE ID |
| location-lat | LATITUDE OF VEHICLE |
| location-lon | LONGITUDE OF VEHICLE |
| location-alt | ALTITUDE OF VEHICLE |

FIG. 15

126

| FIELD NAME | ITEM NAME | FORMAT |
|---|---|---|
| timestamp | TIME | long |
| schedule-type | SCHEDULE TYPE | keyword |
| gateway-id | GATEWAY ID | keyword |
| object-id | OBJECT ID | keyword |
| shadow-version | TIME (GW) | long |
| vin | VEHICLE ID | keyword |
| location | LOCATION | geo_point |
| alt | ALTITUDE | float |

FIG. 16

| AUTHORIZATION OBJECT DB | | | | |
|---|---|---|---|---|
| SERVICE USER ID | AUTHORIZATION CLASS | AUTHORIZATION OBJECT | EXPIRATION DATE | |
| User-001 | Open | {LIST OF ACCESSIBLE VEHICLE OBJECT-IDS} | {START DATE} | {END DATE} |
| User-001 | Class1 | ... | ... | ... |
| User-002 | Class3 | ... | ... | ... |
| ... | ... | ... | ... | ... |

FIG. 17

| AUTHORIZATION CLASS DB | | | | |
|---|---|---|---|---|
| AUTHORIZATION CLASS | API | ACQUISITION AUTHORITY | EXPIRATION DATE | |
| Open | {AVAILABLE API URL} | {LIST OF ACQUIRABLE DATA} | {START DATE} | {END DATE} |
| Class1 | ... | ... | ... | ... |
| Class2 | ... | ... | ... | ... |
| Class3 | ... | ... | ... | ... |
| Full | ... | ... | ... | ... |

FIG. 20

| | | |
|---|---|---|
| RECTANGLE DESIGNATION | UPPER LEFT CORNER COORDINATES (LATITUDE, LONGITUDE)<br>LOWER RIGHT CORNER COORDINATES (LATITUDE, LONGITUDE) | 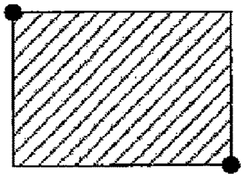 |
| POLYGON DESIGNATION | 1ST VERTEX COORDINATES (LATITUDE, LONGITUDE)<br>2ND VERTEX COORDINATES (LATITUDE, LONGITUDE)<br>...<br>N-TH VERTEX COORDINATES (LATITUDE, LONGITUDE) | 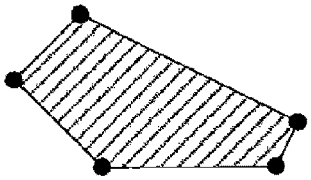 |
| NEIGHBORHOOD DESIGNATION | CENTER COORDINATES (LATITUDE, LONGITUDE)<br>DISTANCE (LENGTH) | 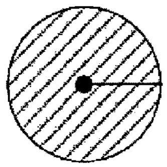 |

FIG. 21

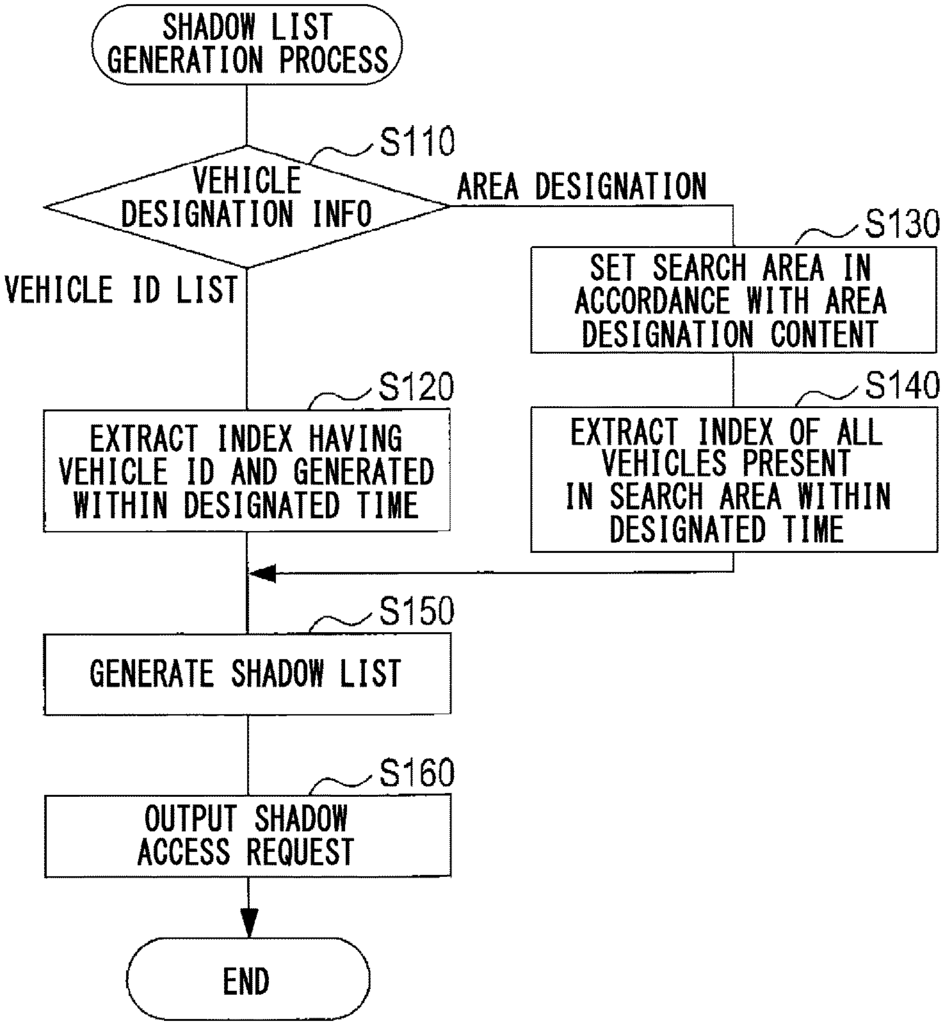

| VEHICLE CONTROL REQUEST DESIGNATION INFO |
| --- |
| VEHICLE DESIGNATION INFO (VEHICLE ID) |
| IMPLEMENTATION TARGET INFO (APP ID) |
| CONTROL DESIGNATION INFO |
| PRIORITY INFO |
| TIME LIMIT INFO |
| VEHICLE AUTHENTICATION INFO (OWNER ID, PASSWORD) |

HISTORY DATA
(CONTENT STORED IN CONTROL HISTORY MEM UNIT 134)

| |
|---|
| VEHICLE DESIGNATION INFO (VEHICLE ID) |
| ORDER ID |
| PRIORITY INFO |
| CONTROL DESIGNATION INFO |
| CONTROL STATUS |

MOBILITY SERVICE BASE SERVER, MOBILITY SERVICE PROVIDING SYSTEM, VEHICLE ACCESS CONTROL METHOD, AND STORAGE MEDIUM

CROSS REFERENCE TO RELATED APPLICATIONS

The present application is a continuation application of International Patent Application No. PCT/JP2022/025810 filed on Jun. 28, 2022 which designated the U.S. and claims the benefit of priority from Japanese Patent Application No. 2021-110903 filed on Jul. 2, 2021. The entire disclosures of all of the above applications are incorporated herein by reference.

TECHNICAL FIELD

The present disclosure relates to a technology for providing a mobility service.

BACKGROUND

A related art describes a digital twin simulation that reproduces a state of a vehicle in a real world in a virtual space by collecting vehicle data from the vehicle.

SUMMARY

A mobility service base server includes a vehicle-side unit and a service-side unit. The vehicle-side unit includes a vehicle control unit configured to execute access to a target vehicle, the target vehicle being a vehicle to be accessed, by performing wireless communication with the in-vehicle device mounted on the target vehicle when the interface unit receives the access request for the vehicle. The vehicle control unit is configured to execute relay control in response to a control instruction transmitted to and received from the in-vehicle device.

BRIEF DESCRIPTION OF THE DRAWINGS

FIG. 5 is a diagram illustrating a configuration of a vehicle data conversion table.

FIG. 13 is a diagram illustrating a configuration of a shadow.

FIG. 14 is a diagram illustrating a configuration of a latest index.

FIG. 15 is a diagram illustrating a configuration of an index.

FIG. 16 is a diagram illustrating a configuration of an authorization object database included in an authorization information memory unit.

FIG. 17 is a diagram illustrating a configuration of an authorization class database included in an authorization information memory unit.

FIG. 20 is an explanatory diagram of a method of designating an area.

FIG. 21 is a flowchart of a shadow list generation process executed by an index acquisition unit.

FIG. 33 is a sequence diagram illustrating an operation when a power state of a vehicle as a target of a vehicle control request is on.

DETAILED DESCRIPTION

Figure 1:
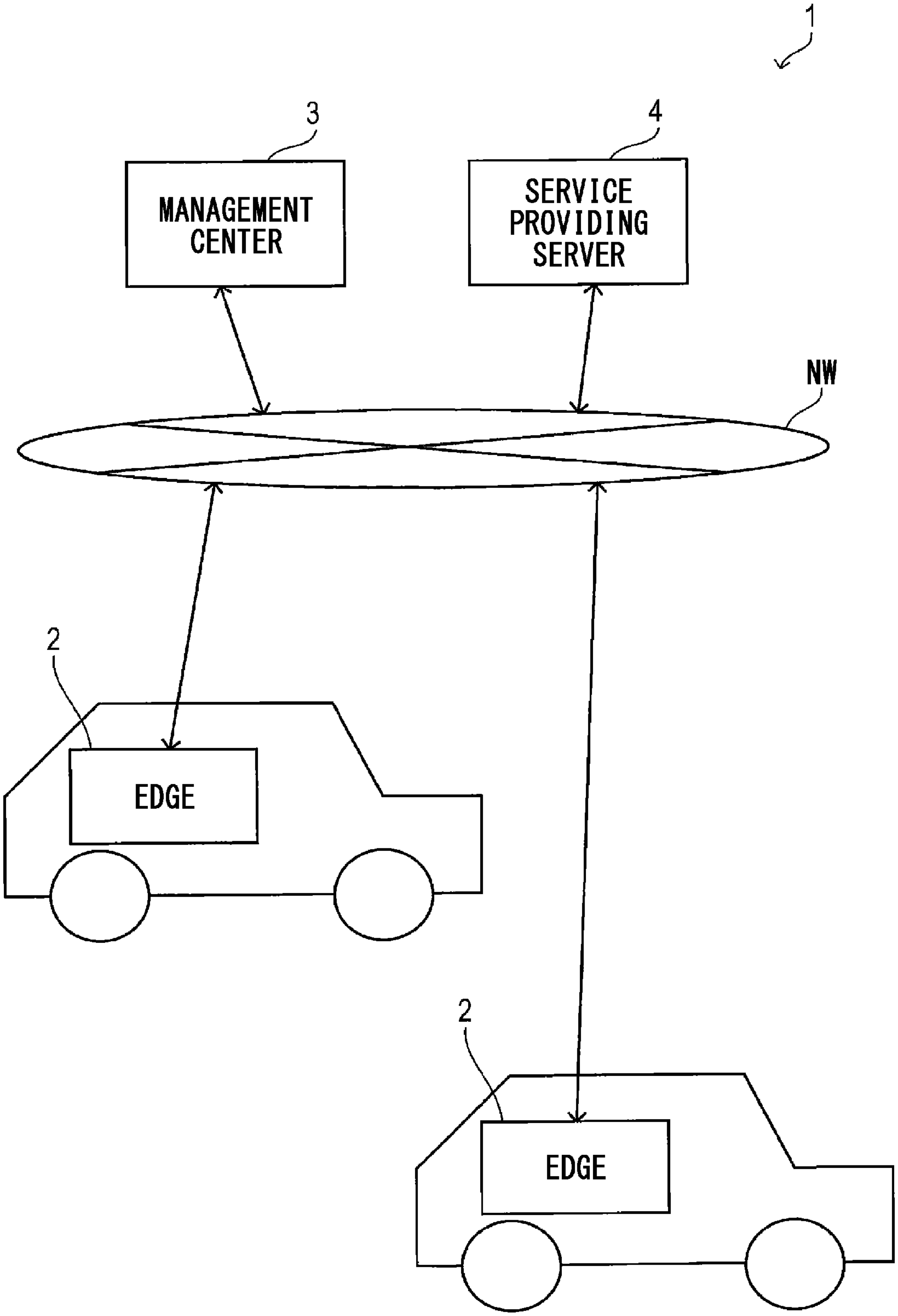
FIG. 1 is a block diagram illustrating a configuration of a mobility IoT system.

In response to the spread of mobility services, it has been studied to access a vehicle via a system and realize various applications using functions of the vehicle.

The present disclosure provides a technique for improving reliability of vehicle access related to mobility services.

According to one aspect of the present disclosure, a mobility service base server is provided. The mobility service base server includes a vehicle-side unit and a service-side unit.

The vehicle-side unit includes a first database storing a plurality of shadows each of which represents a state of a vehicle at a specific time, each of the plurality of shadows being generated for the vehicle based on vehicle data provided from an in-vehicle device mounted on the vehicle.

The service-side unit includes a second database storing an index corresponding to each of the shadows accumulated in the first database and having information to be used for searching for the each shadow, and an interface unit configured to receive an access request from an outside.

The vehicle-side unit further includes a vehicle control unit configured to execute access to a target vehicle, the target vehicle being a vehicle to be accessed, by performing wireless communication with the in-vehicle device mounted on the target vehicle when the interface unit receives the access request for the vehicle. The vehicle control unit is configured to execute relay control in response to a control instruction transmitted to and received from the in-vehicle device.

According to such a configuration, reliability of vehicle access can be improved.

According to one aspect of the present disclosure, a mobility service providing system is provided. The mobility service providing system includes an in-vehicle device mounted on a vehicle and the mobility service base server.

According to one aspect of the present disclosure, a vehicle access control method is provided. The vehicle access control method in a mobility service base server includes a first database, a second database, and in interface unit.

The vehicle access control method comprise executing access to a target vehicle, the target vehicle being a vehicle to be accessed, by performing wireless communication with the in-vehicle device mounted on the target vehicle when the interface unit receives the access request for the vehicle; and executing relay control in response to a control instruction transmitted to and received from the in-vehicle device in access to the target vehicle.

According to one aspect of the present disclosure, a program and a storage medium are provided. A computer executing a program configures a mobility service base server together with a first database, a second database, and an interface unit.

The program causes the computer to function as a vehicle control unit. The vehicle control unit is configured to execute access to a target vehicle, the target vehicle being a vehicle to be accessed, by performing wireless communication with the in-vehicle device mounted on the target vehicle when the interface unit receives the access request for the vehicle and execute relay control in response to a control instruction transmitted to and received from the in-vehicle device in access to the target vehicle.

Hereinafter, embodiments of the present disclosure will be described with reference to the drawings.

1. System Overview

As illustrated in FIG. 1, a mobility IoT system 1 of the present embodiment includes a plurality of edge devices 2, a management center 3, and a service providing server 4. IoT stands for Internet of Things.

The edge device 2 is mounted on a vehicle and has a function of performing data communication with the management center 3 via a wide area wireless communication network NW.

The management center 3 is a device that manages the mobility IoT system 1. The management center 3 has a function of performing data communication with the plurality of edge devices 2 and the service providing server 4 via the wide area wireless communication network NW.

The service providing server 4 is, for example, a server installed to provide a service for managing the operation of the vehicle. Note that the mobility IoT system 1 may include a plurality of service providing servers 4 having different service content. The service providing server 4 may be configured as an on-premises server or may be configured as a cloud server. In addition, the service providing server 4 may be configured as a server that is physically the same as the management center 3.

2. Edge Device

[2-1. Device Configuration]

Figure 2:
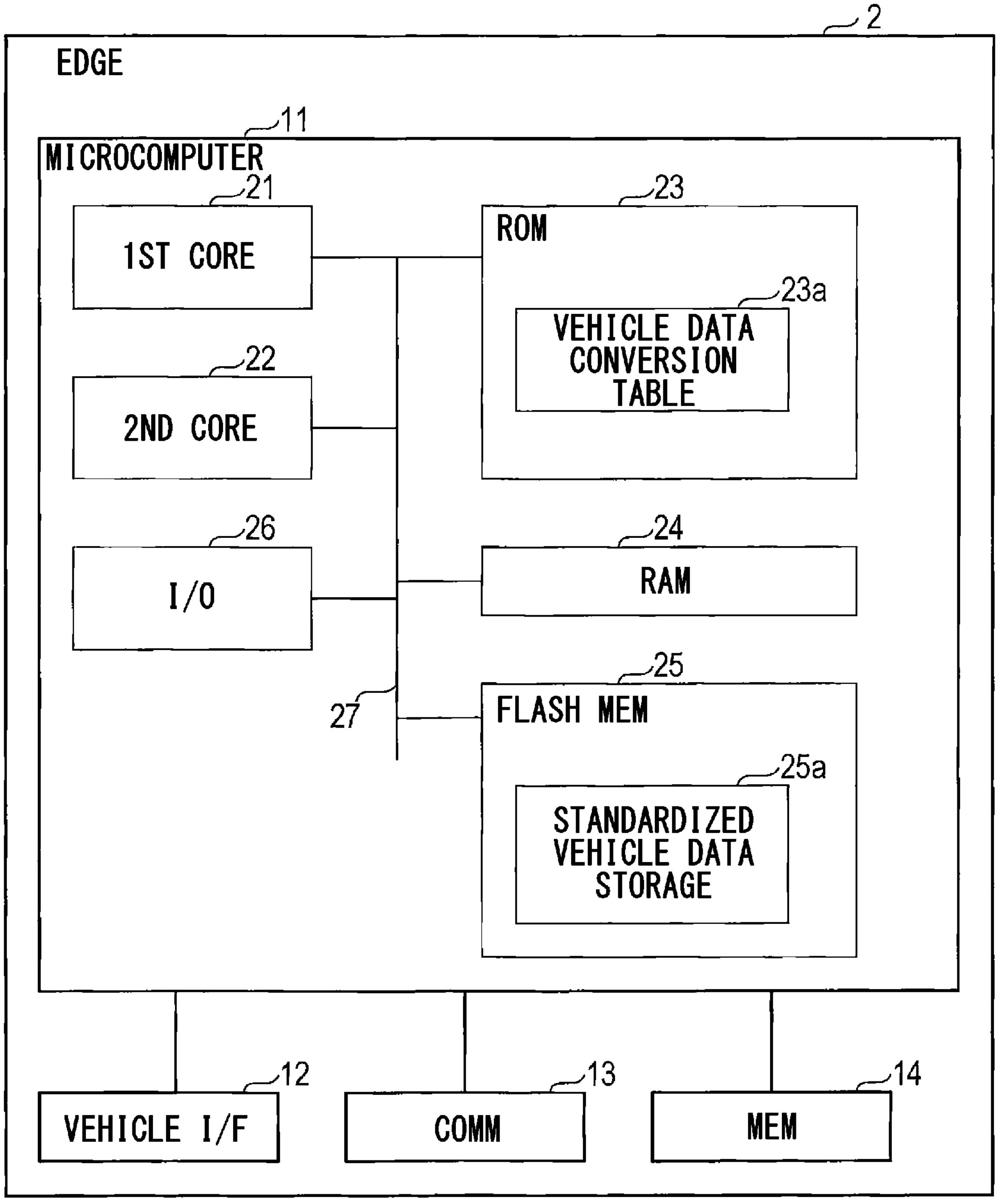
FIG. 2 is a block diagram illustrating a configuration of an edge device.

As illustrated in FIG. 2, the edge device 2 includes a microcomputer 11, a vehicle interface (vehicle I/F) 12, a communication unit 13, and a memory unit 14.

The microcomputer 11 includes a first core 21, a second core 22, a ROM 23, a RAM 24, a flash memory 25, an input/output unit 26, and a bus 27.

Various functions of the microcomputer 11 are implemented by the first core 21 and the second core 22 executing programs stored in a non-transitory tangible recording medium is realized. In this example, the ROM 23 corresponds to a non-transitory tangible recording medium storing a program. Further, by executing this program, a method corresponding to the program is executed.

Some or all of the functions executed by the first core 21 and the second core 22 may be configured as hardware by one or a plurality of ICs or the like.

The flash memory 25 is a data-rewritable nonvolatile memory. The flash memory 25 includes a standardized vehicle data storage unit 25*a* storing standardized vehicle data to be described later.

The input/output unit 26 is a circuit for inputting/outputting data between the outside of the microcomputer 11 and the first core 21 and the second core 22.

The bus 27 connects the first core 21, the second core 22, the ROM 23, the RAM 24, the flash memory 25, and the input/output unit 26 such that data can be input and output to and from each other.

The vehicle I/F 12 is an input/output circuit for inputting/outputting signals to/from an electronic control device, a sensor, and the like mounted on the vehicle.

The vehicle I/F 12 includes a power supply voltage input port, a general-purpose input/output port, a CAN communication port, an Ethernet communication port, and the like. The CAN communication port is a port for transmitting and receiving data in accordance with the CAN communication protocol. The Ethernet communication port is a port for transmitting and receiving data based on the Ethernet communication protocol. CAN stands for Controller Area Network. CAN is a registered trademark. Ethernet is a registered trademark.

Another electronic control device mounted on the vehicle is connected to the CAN communication port and the Ethernet communication port. The edge device 2 can transmit and receive a communication frame to and from another electronic control device.

The communication unit 13 performs data communication with the management center 3 via the wide area wireless communication network NW.

The memory unit 14 is a storage device for storing various pieces of data.

Figure 36:
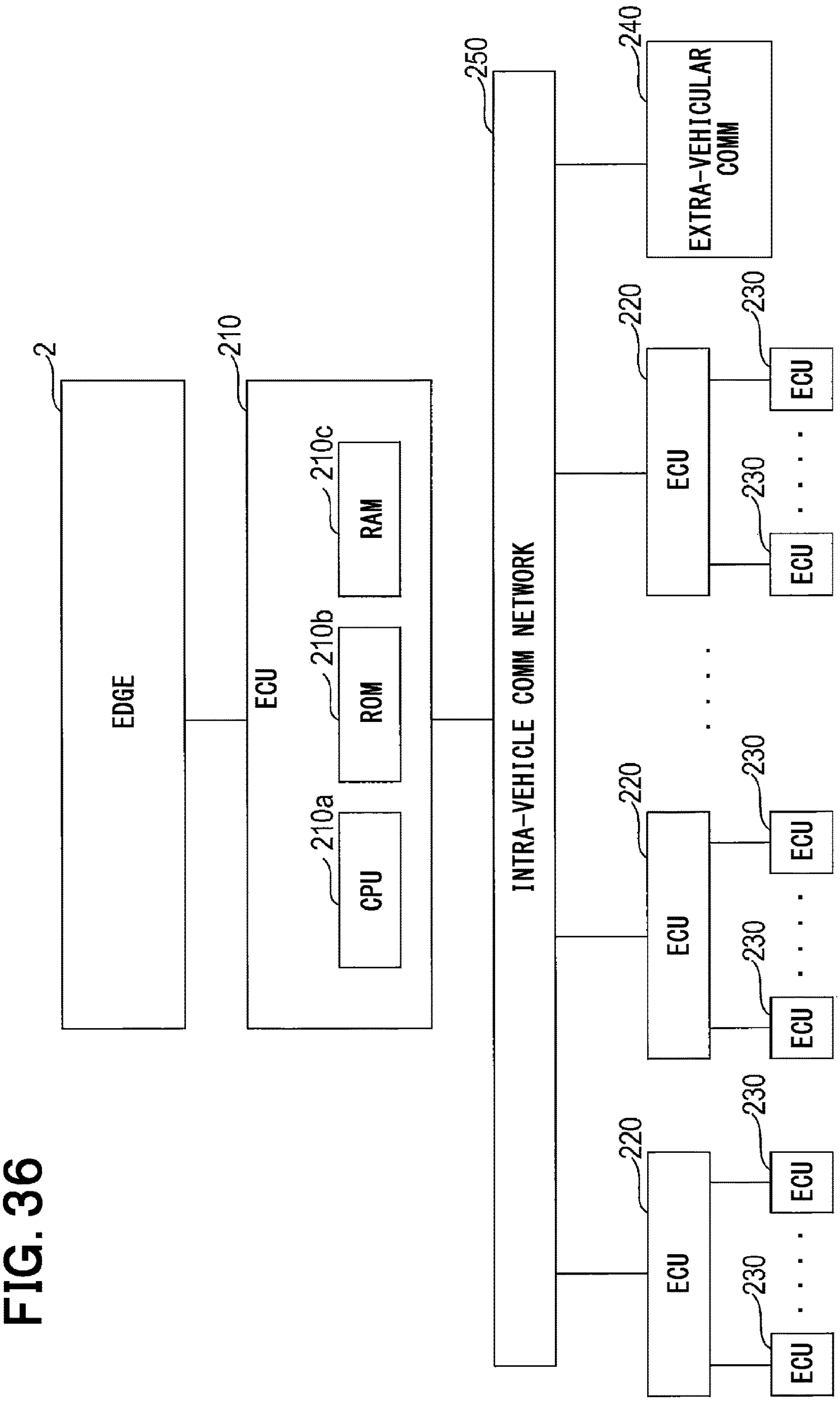
FIG. 36 is a block diagram illustrating a connection state of an ECU mounted on a vehicle.

As illustrated in FIG. 36, one ECU 210, a plurality of ECUs 220, a plurality of ECUs 230, an extra-vehicular communication device 240, and an intra-vehicle communication network 250 are mounted on the vehicle. ECU stands for Electronic Control Unit.

The ECU 210 integrates the plurality of ECUs 220 to implement cooperative control of the entire vehicle.

The ECU 220 is provided for each domain divided according to functions in the vehicle, and mainly executes control of the plurality of ECUs 230 existing in the domain. Each ECU 220 is connected to a subordinate ECU 230 via a lower layer network (for example, CAN) individually provided. The ECU 220 has a function of centrally managing access authority and the like to the subordinate ECUs 230 and performing authentication and the like of a user. The domain is, for example, a powertrain, a body, a chassis, a cockpit, or the like.

The ECU 230 connected to the ECU 220 belonging to the domain of the powertrain includes, for example, an ECU 230 that controls an engine, an ECU 230 that controls a motor, an ECU 230 that controls a battery, and the like.

The ECU 230 connected to the ECU 220 belonging to the body domain includes, for example, an ECU 230 that controls an air conditioner, an ECU 230 that controls a door, and the like.

The ECU 230 connected to the ECU 220 belonging to the chassis domain includes, for example, an ECU 230 that controls a brake, an ECU 230 that controls a steering, and the like.

The ECU 230 connected to the ECU 220 belonging to the cockpit domain includes, for example, an ECU 230 that controls meter and navigation display, an ECU 230 that controls an input device operated by an occupant of the vehicle, and the like.

The extra-vehicular communication device 240 performs data communication with a communication device outside the vehicle (for example, a cloud server) via the wide area wireless communication network NW.

The intra-vehicle communication network 250 includes CAN FD and Ethernet. CAN FD stands for CAN with Flexible Data Rate. The CAN FD connects the ECU 210, each ECU 220, and the extra-vehicular communication device 240 via a bus. The Ethernet individually connects the ECU 210, each ECU 220, and the extra-vehicular communication device 240.

The ECU 210 is an electronic control device mainly composed of a microcomputer including a CPU 210*a*, a ROM 210*b*, a RAM 210*c*, and the like. Various functions of the microcomputer are implemented by the CPU 210*a* executing a program stored in a non-transitory tangible recording medium. In this example, The ROM 210*b* corresponds to a non-transitory tangible recording medium storing a program. Further, by executing this program, a method corresponding to the program is executed. Some or all of the functions executed by the CPU 210*a* may be configured as hardware by one or a plurality of ICs or the like. In addition, the number of microcomputers constituting the ECU 210 may be one or more.

Each of the ECU 220, the ECU 230, and the extra-vehicular communication device 240 is an electronic control device mainly including a microcomputer including a CPU, a ROM, a RAM, and the like, as in the ECU 210. In addition, the number of microcomputers constituting the ECU 220, the ECU 230, and the extra-vehicular communication device 240 may be one or more. The ECU 220 is an ECU that controls one or more ECUs 230, and the ECU 210 is an ECU that controls one or more ECUs 220 or controls the ECUs 220, 230 of the entire vehicle including the extra-vehicular communication device 240.

The edge device 2 is connected to the ECU 210 so as to enable data communication with the ECU 210. That is, the edge device 2 receives information about the ECUs 210, 220, 230 via the ECU 210. In addition, the edge device 2 transmits a request related to vehicle control to the ECU 210 or to the ECUs 220, 230 via the ECU 210.

[2-2. Functional Configuration]

Figure 3:
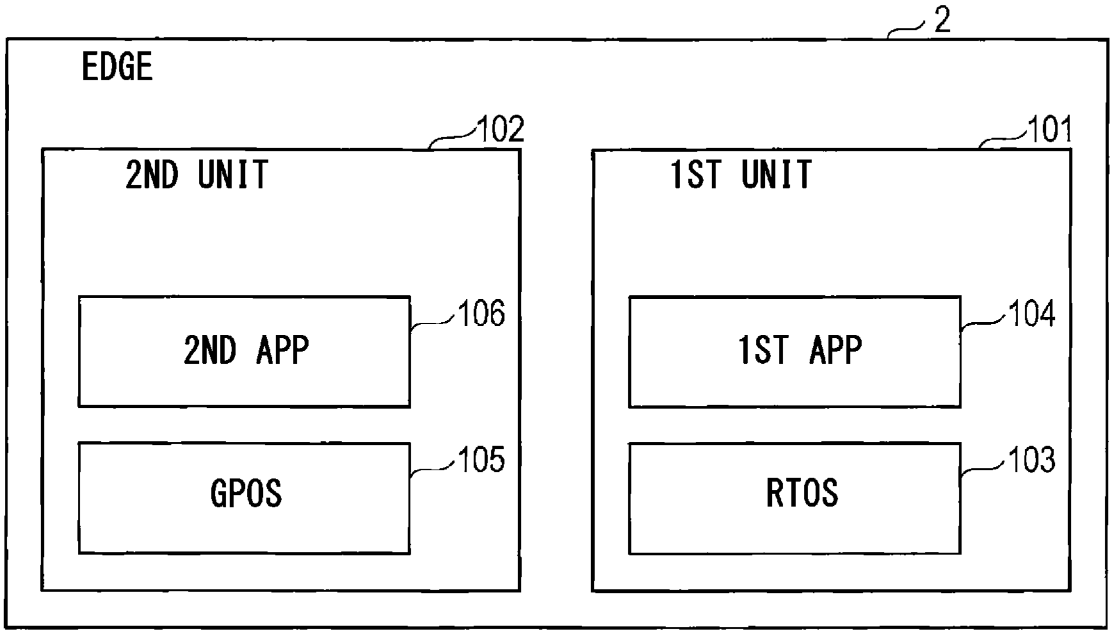
FIG. 3 is a functional block diagram illustrating a functional configuration of an edge device.

As illustrated in FIG. 3, the edge device 2 includes a first unit 101 as a functional block implemented by the first core 21 executing a program stored in the ROM 23. The edge device 2 includes a second unit 102 as a functional block implemented by the second core 22 executing the program stored in the ROM 23.

The first unit 101 includes a real-time operating system (in the following, RTOS) 103 and a first application 104.

The first application 104 executes various processes for controlling the vehicle. The first application 104 is configured to be able to access the standardized vehicle data storage unit 25*a* of the flash memory 25 and refer to the standardized vehicle data in order to execute various processes for controlling the vehicle.

The RTOS 103 manages the first application 104 so that real-time performance of processing by the first application 104 can be secured.

The second unit 102 includes a general-purpose operating system (in the following, GPOS) 105 and a second application 106.

The second application 106 executes processing related to a service provided by the service providing server 4. The second application 106 is configured to be able to access the standardized vehicle data storage unit 25*a* of the flash memory 25 and refer to the standardized vehicle data in order to execute processing related to the service.

The GPOS 105 is basic software installed in the edge device 2 to operate various applications, and manages the second application 106.

[2-3. Data Collection Process]

A series of processes in which the edge device 2 collects vehicle data and voluntarily transmits the vehicle data to the management center 3 will be described.

First, processing executed by the vehicle I/F 12 will be described.

Upon receiving the communication frame, the vehicle I/F 12 determines the communication protocol of the communication frame based on the communication port that has received the communication frame. Specifically, for example, when the communication frame is received through the CAN communication port, the vehicle I/F 12 determines that the communication protocol of the received communication frame is the CAN communication protocol. For example, when the communication frame is received through the Ethernet communication port, the vehicle I/F 12 determines that the communication protocol of the received communication frame is the Ethernet communication protocol.

Then, the vehicle I/F 12 determines whether the communication frame is a communication frame to be processed by the edge device 2 based on the identification information about the communication frame to output the received communication frame to the first unit 101 when determining that the communication frame is the communication frame to be processed.

Figure 4:
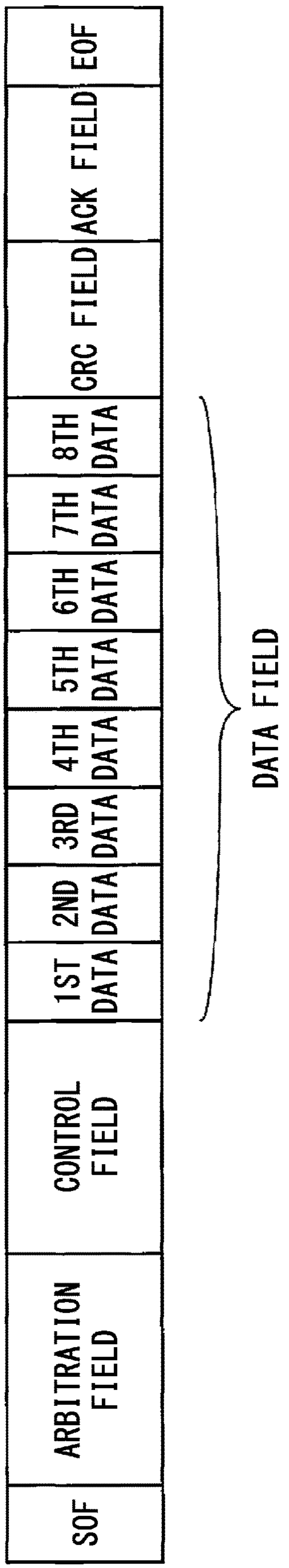
FIG. 4 is a diagram illustrating a configuration of a frame.

As illustrated in FIG. 4, the CAN frame includes a start of frame, an arbitration field, a control field, a data field, a CRC field, an ACK field, and an end of frame. The arbitration field includes an 11-bit or 29-bit identifier (that is, ID) and 1-bit RTR bit.

Further, an 11-bit identifier used in CAN communication is referred to as a CANID. The CANID is preset based on content of data included in the CAN frame, a transmission source of the CAN frame, a transmission destination of the CAN frame, and the like.

The data field includes first data, second data, third data, fourth data, fifth data, sixth data, seventh data, and eighth data of 8 bits (that is, one byte), respectively. Hereinafter, each of the first to eighth data in the data field is also referred to as CAN data.

Therefore, when receiving the CAN frame, the vehicle I/F 12 determines whether the frame is a frame to be processed based on the CANID.

Next, processing executed by the first unit 101 will be described.

When acquiring the communication frame output from the vehicle I/F 12, the first unit 101 extracts identification information and data from the communication frame, and creates standard format data including the identification information and the data. The first unit 101 stores the created standard format data in the flash memory 25. For example, when acquiring a CAN frame, the first unit 101 creates standard format data including the CANID and the first to eighth data.

When the standard format data including the same identification information as the created standard format data is already stored in the flash memory 25, the first unit 101 updates the standard format data by overwriting the standard format data.

Next, processing executed by the second unit 102 will be described.

The second core 22 acquires the standard format data from the flash memory 25.

Then, the second core 22 divides the data included in the acquired standard format data. For example, since the standard format data generated from the CAN frame includes the CANID and the first to eighth data, the second core 22 divides the first to eighth data by 1 byte and extracts 8 pieces of CAN data. The standard format data may be written and read by the first unit 101 and the second unit 102 using the RAM 24 instead of the flash memory 25.

Further, the second core 22 refers to a vehicle data conversion table 23*a* stored in the ROM 23, and converts each divided piece of extracted data into a control label and vehicle data.

The vehicle data conversion table 23*a* includes normalization information and semantic information.

The normalization information is information for normalizing the extracted data so that the same physical quantity has the same value regardless of the vehicle type and the vehicle manufacturer.

The semantic information is information for conversion into meaningful vehicle data using normalized vehicle data. Hereinafter, the normalized and semantic vehicle data is also referred to as processed data, and the vehicle data before being normalized and semantic is also referred to as raw data. The raw data refers to, for example, data indicated in a data field of a CAN frame.

As illustrated in FIG. 5, the normalization information about the vehicle data conversion table 23*a* includes, for example, "CANID", "ECU", "position", "DLC", "unique label", "resolution", "offset", and "unit" as setting items.

The "ECU" is information indicating an ECU of a transmission source of the CAN frame. For example, the "ENG" indicates an engine ECU.

The "position" is information indicating the position of the CAN data in the data field. The "DLC" is information indicating a data length. DLC stands for Data Length Code.

The "unique label" is information indicating a control label. For example, the "ETHA" indicates an intake air temperature, and the "NE1" indicates an engine speed. The "resolution" is information indicating a numerical value per bit.

Therefore, data corresponding to the "unique label" is extracted from the standard format data by the "CANID", the "ECU", the "position", the "DLC", and the "unique label". Further, the extracted data is converted into vehicle data converted into a value represented by "unit" by the "resolution" and the "offset".

For example, as illustrated in FIG. 5, the semantic information about the vehicle data conversion table 23*a* includes a conversion formula for converting into the "steering angle" by subtracting the "steering zero point" with the control label "SSAZ" from the "steering movement angle" with the control label "SSA". According to this conversion formula, data is converted into vehicle data representing a "steering angle" having a meaning of a "steering amount from a reference position" from vehicle data representing a "steering movement angle" and vehicle data representing a "steering zero point".

The second core 22 hierarchically stores the converted vehicle data in the flash memory 25. Specifically, the second core 22 stores the converted vehicle data in the corresponding area of the standardized vehicle data storage unit 25*a* provided in the flash memory 25.

The standardized vehicle data storage unit 25*a* stores standardized vehicle data configured by hierarchizing vehicle data.

Figure 6:
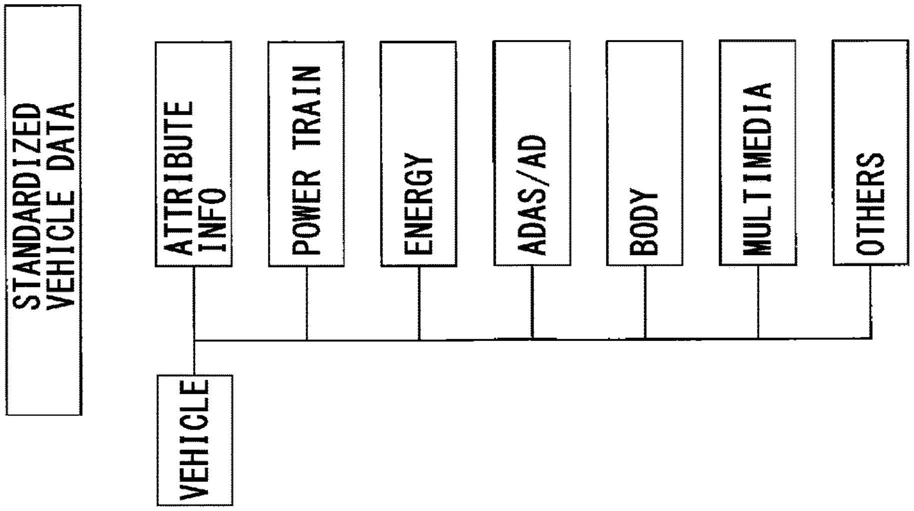
FIG. 6 is a diagram illustrating a first hierarchy of standardized vehicle data and a data format.

The standardized vehicle data is created for each vehicle (that is, for each edge device 2) and has a plurality of hierarchical structures. In the standardized vehicle data, one or more items are set for each of a plurality of hierarchies. For example, as illustrated in FIG. 6, the standardized vehicle data includes "attribute information", "power train", "energy", "ADAS/AD", "body", "multimedia", and "others" as items set in the first hierarchy at the highest level. ADAS stands for Advanced Driver Assistance System. AD stands for Autonomous Driving. The "attribute information", the "power train", the "energy", and the like correspond to categories.

In addition, each vehicle data includes, as items, "unique label", "ECU", "data type", "data size", "data value", and "data unit". The "unique label" and the "ECU" are as described above. The "data type", the "data size", and the "data unit" indicate a type, size, and unit related to the numerical value indicated by the "data value".

Figure 7:
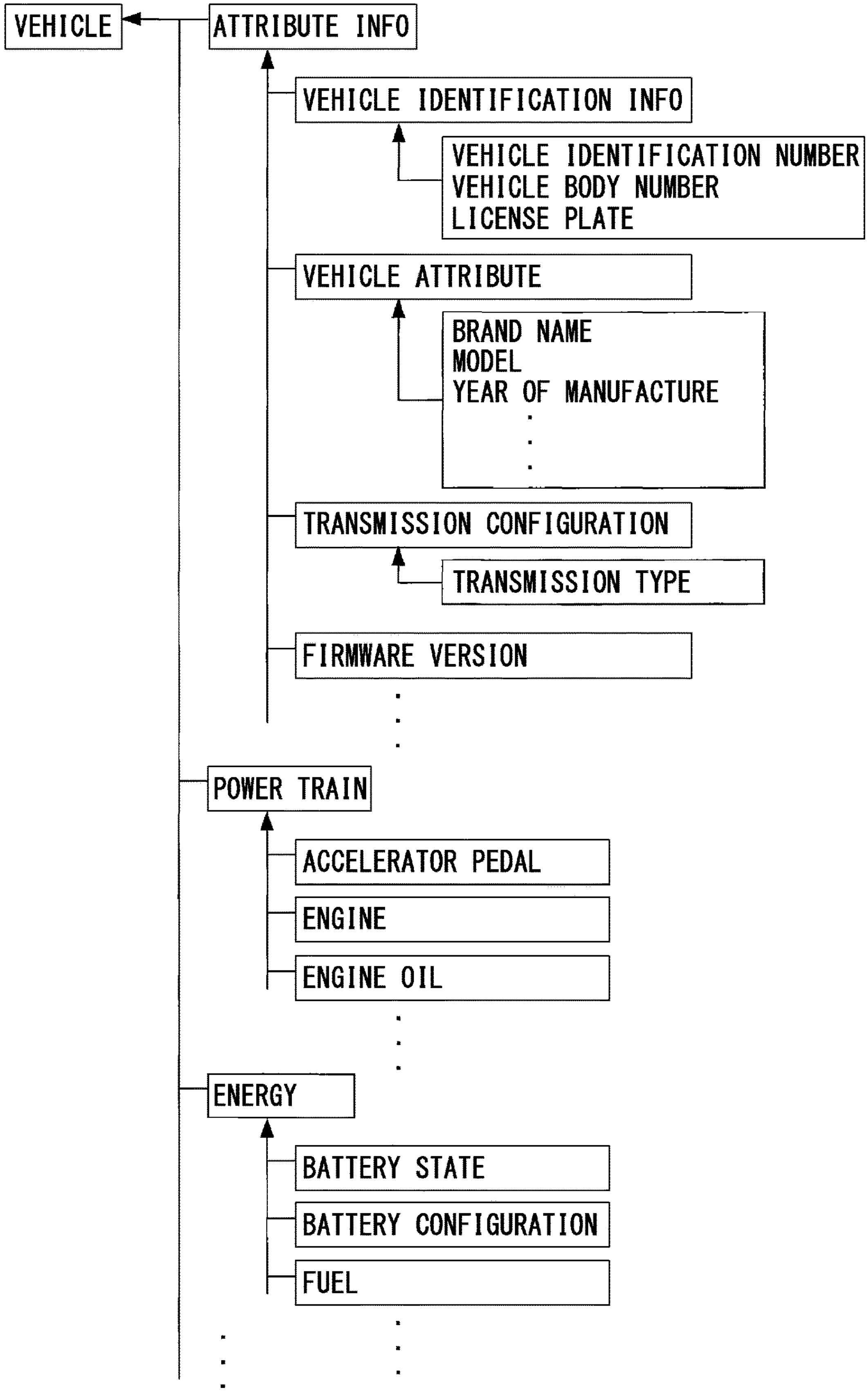
FIG. 7 is a diagram illustrating a configuration of standardized vehicle data.

As illustrated in FIG. 7, the standardized vehicle data includes at least a second hierarchy and a third hierarchy in addition to the first hierarchy. The second hierarchy is a hierarchy immediately below the first hierarchy, and the third hierarchy is a hierarchy immediately below the second hierarchy. The standardized vehicle data is an item set in the normalization and semantic processing described above. The standardized vehicle data has a hierarchical data structure.

For example, the "attribute information" which is an item in the first hierarchy includes a "vehicle identification information", a "vehicle attribute", a "transmission configuration", a "firmware version", and the like as items in the second hierarchy. The “vehicle identification information” is a category name indicating information that can uniquely identify the vehicle. “Vehicle attribute” is a category name indicating a type of vehicle. The “transmission configuration” is a category name indicating information about the transmission. The “firmware version” is a category name indicating information related to firmware of the vehicle.

In addition, the “power train” which is an item in the first hierarchy is a category name indicating information about the power train. The “power train” includes an “accelerator pedal”, an “engine”, an “engine oil”, and the like as items in the second hierarchy. The “accelerator pedal” includes one or more pieces of vehicle data such as a state and an opening degree of the accelerator pedal. The “engine” includes one or more pieces of individual vehicle data such as an engine state and a rotation speed. Items in the second hierarchy also correspond to categories. The same applies to the items in the other first hierarchy.

In addition, the “energy” which is an item in the first hierarchy is a category name indicating information about energy. The “energy” includes a “battery state”, a “battery configuration”, “fuel”, and the like as items in a second hierarchy.

The item “vehicle identification information” in the second hierarchy includes a “vehicle identification number”, a “vehicle body number”, and a “license plate” as items in the third hierarchy. The items in the third hierarchy are one or more pieces of individual vehicle data, and are also referred to as items. That is, in the hierarchical structure of the standardized vehicle data, items in the lowermost hierarchy are referred to as items, and items in the hierarchies other than the lowermost hierarchy (that is, an item having a lower hierarchy) are referred to as categories.

Further, the “vehicle attribute” which is an item in the second hierarchy includes a “brand name”, a “model”, a “year of manufacture”, and the like as items in the third hierarchy.

The “transmission configuration” which is an item in the second hierarchy includes a “transmission type” as an item in the third hierarchy.

For example, when the control label of the converted vehicle data is “vehicle identification information”, the second core 22 stores the converted vehicle data in a storage area in which the first hierarchy is “attribute information”, the second hierarchy is “vehicle identification information”, and the third hierarchy is “vehicle identification number” in the standardized vehicle data storage unit 25*a*.

The “others” may include, for example, position information acquired from a GPS device mounted on the vehicle via the vehicle I/F 12, that is, latitude, longitude, and altitude.

Figure 8:
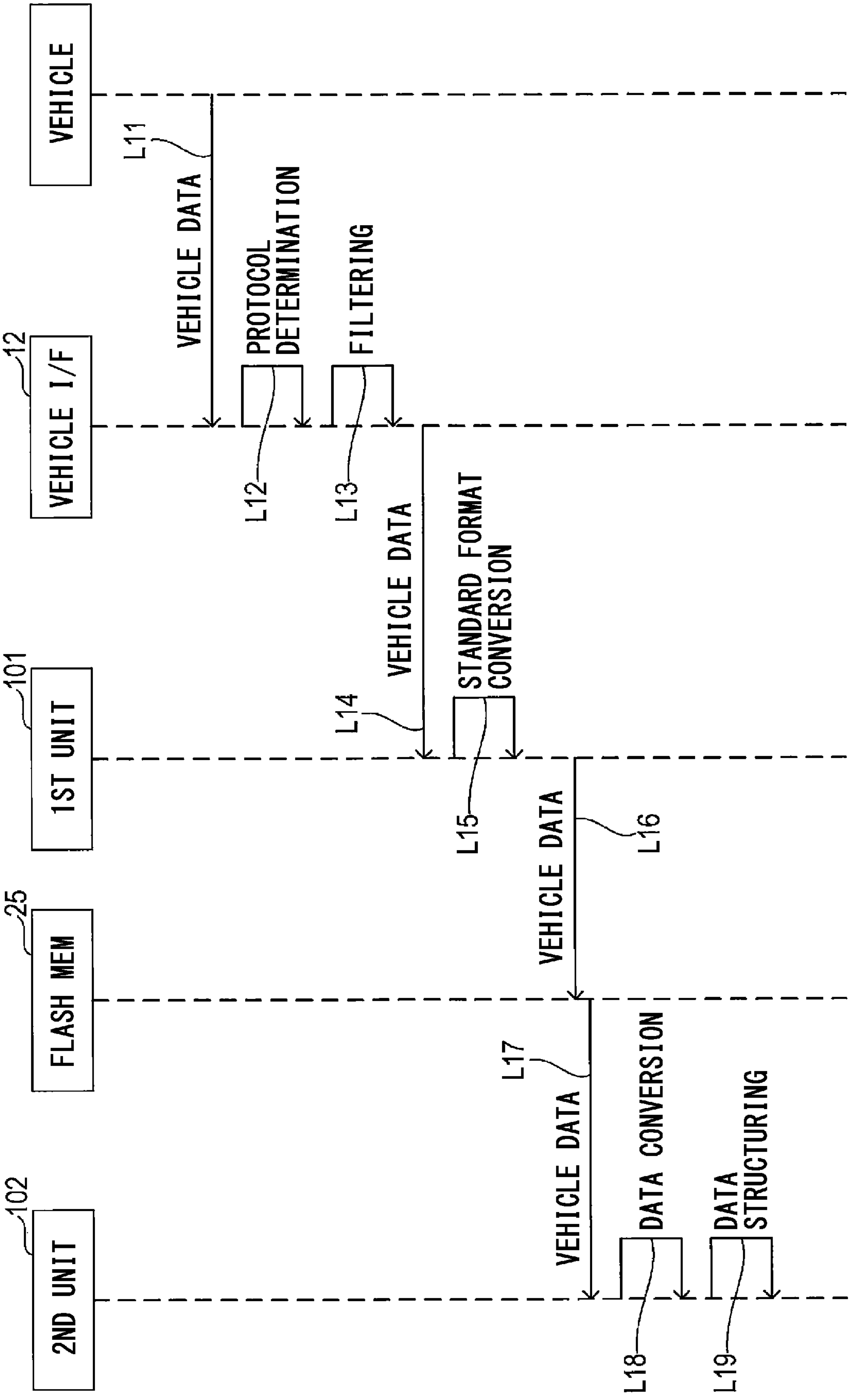
FIG. 8 is a sequence diagram showing a procedure for creating standardized vehicle data.

Next, a procedure in which the edge device 2 creates the standardized vehicle data will be described using the sequence diagram illustrated in FIG. 8.

As indicated by an arrow L11, when the vehicle I/F 12 acquires vehicle data from the vehicle, the vehicle I/F 12 performs communication protocol determination as indicated by an arrow L12. Further, the vehicle I/F 12 filters unnecessary vehicle data as indicated by an arrow L13 to output necessary vehicle data to the first unit 101 as indicated by an arrow L14.

When acquiring the vehicle data from the vehicle I/F 12, the first unit 101 converts the vehicle data into the standard format as indicated by an arrow L15, and stores the vehicle data converted into the standard format in the flash memory 25 as indicated by an arrow L16.

When acquiring the vehicle data converted into the standard format from the flash memory 25 as indicated by an arrow L17, the second unit 102 converts the acquired vehicle data as indicated by an arrow L18. Further, as indicated by an arrow L19, the second unit 102 creates standardized vehicle data by structuring the converted data.

Next, a procedure of data transmission processing executed by the edge device 2 will be described.

Timing information indicating a timing of transmitting data to the management center 3 is set in each vehicle data belonging to the standardized vehicle data. The timing information is set such that the cycle is shorter as the data changes more frequently and the data whose degree of importance is higher according to the degree of change of the data, the importance of the data, and the like. The timing information is, for example, a 500 ms cycle, a 2 s cycle, a 4 s cycle, a 30 s cycle, a 300 s cycle, a 12 hour cycle, or the like.

The second core 22 executes the transmission processing in a transmission unit time (for example, 250 ms) cycle.

Figure 9:
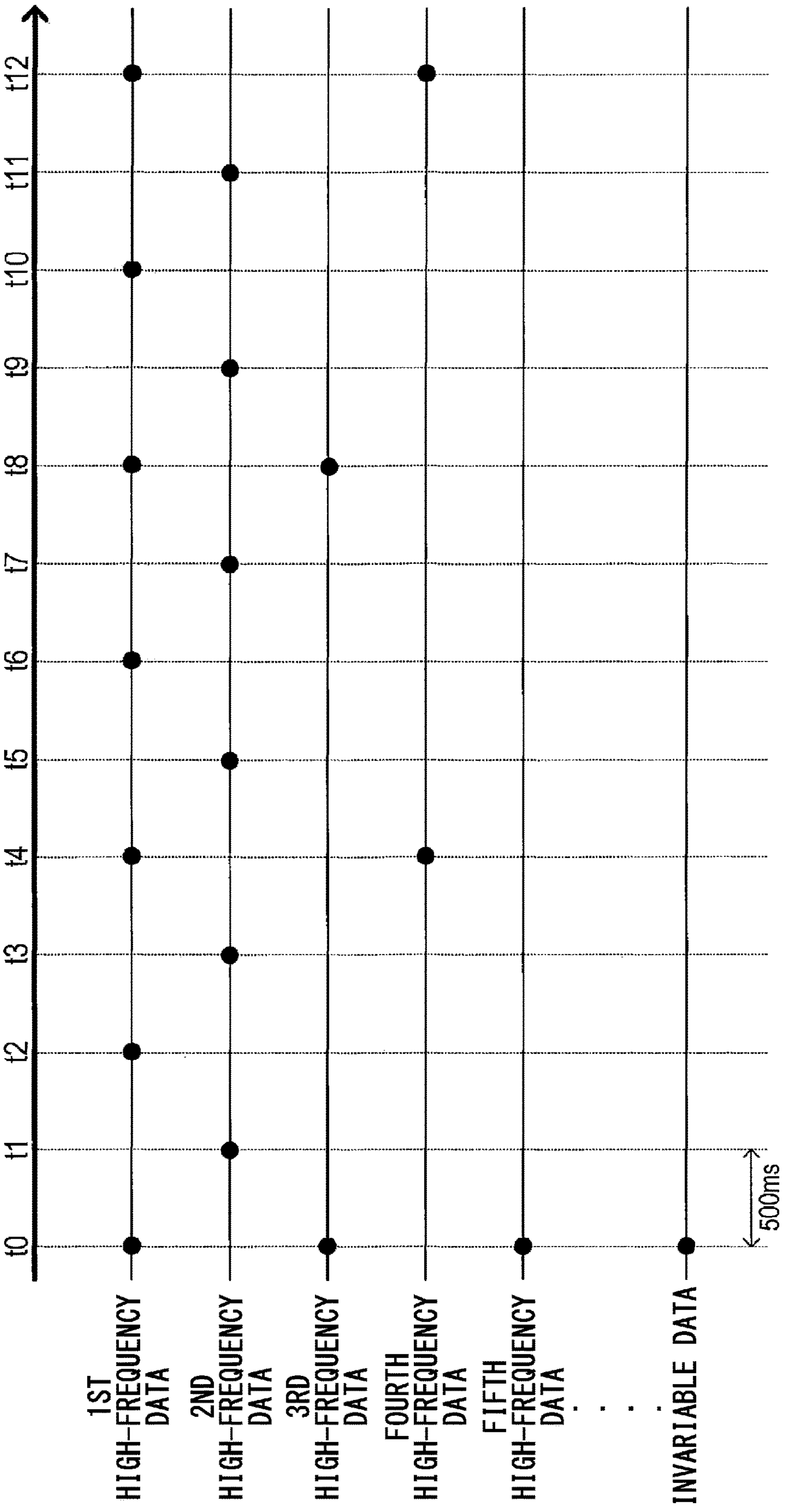
FIG. 9 is a timing chart illustrating data transmission timing.

As illustrated in FIG. 9, the first frequency data, which is vehicle data to be transmitted at a cycle of 500 ms, is divided into two groups and alternately transmitted at each transmission timing. Similarly, the second frequency data, which is the vehicle data transmitted in the 1 s cycle, is divided into two groups or four groups, and the data of each group is transmitted at different transmission timings. That is, by transmitting each vehicle data according to a preset transmission schedule, it is possible to suppress the concentration of transmission of a large amount of vehicle data at the same transmission timing. In addition, efficient transmission is realized by transmitting each vehicle data at a frequency according to its characteristics.

3. Management Center

[3-1. Device Configuration]

Figure 10:
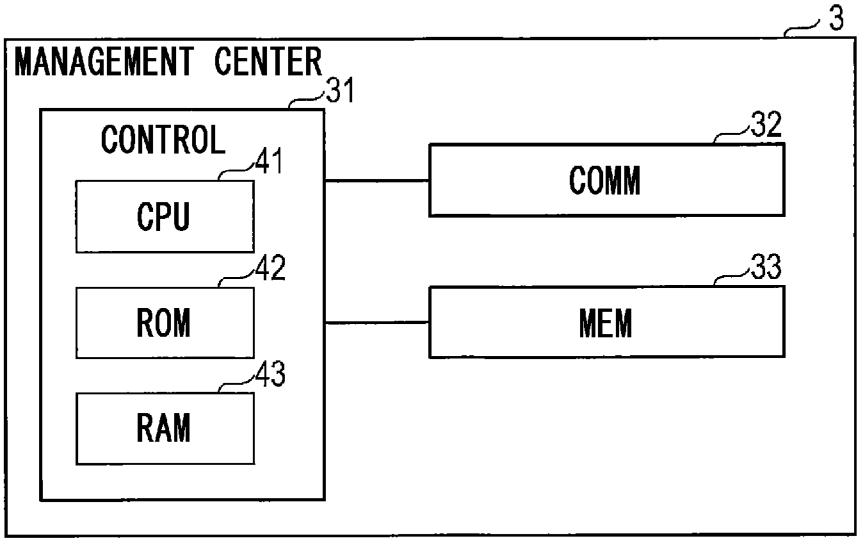
FIG. 10 is a block diagram illustrating a configuration of a management center.

As illustrated in FIG. 10, the management center 3 includes a control unit 31, a communication unit 32, and a memory unit 33.

The control unit 31 is an electronic control device mainly including a microcomputer including a CPU 41, a ROM 42, a RAM 43, and the like. Various functions of the microcomputer are implemented by the CPU 41 executing a program stored in a non-transitory tangible recording medium. In this example, the ROM 42 corresponds to a non-transitory tangible recording medium storing a program. Further, by executing this program, a method corresponding to the program is executed. Some or all of the functions executed by the CPU 41 may be configured as hardware by one or a plurality of ICs or the like. Furthermore, the number of microcomputers constituting the control unit 31 may be one or more.

The communication unit 32 performs data communication with the plurality of edge devices 2 and the service providing server 4 via the wide area wireless communication network NW. Note that MQTT, which is a simple and lightweight protocol of a publishing/subscribing type, is used for communication with the edge device 2. MQTT stands for Message Queue Telemetry Transport.

The memory unit 33 is a storage device for storing various pieces of data.

[3-2. Functional Configuration]

Figure 11:
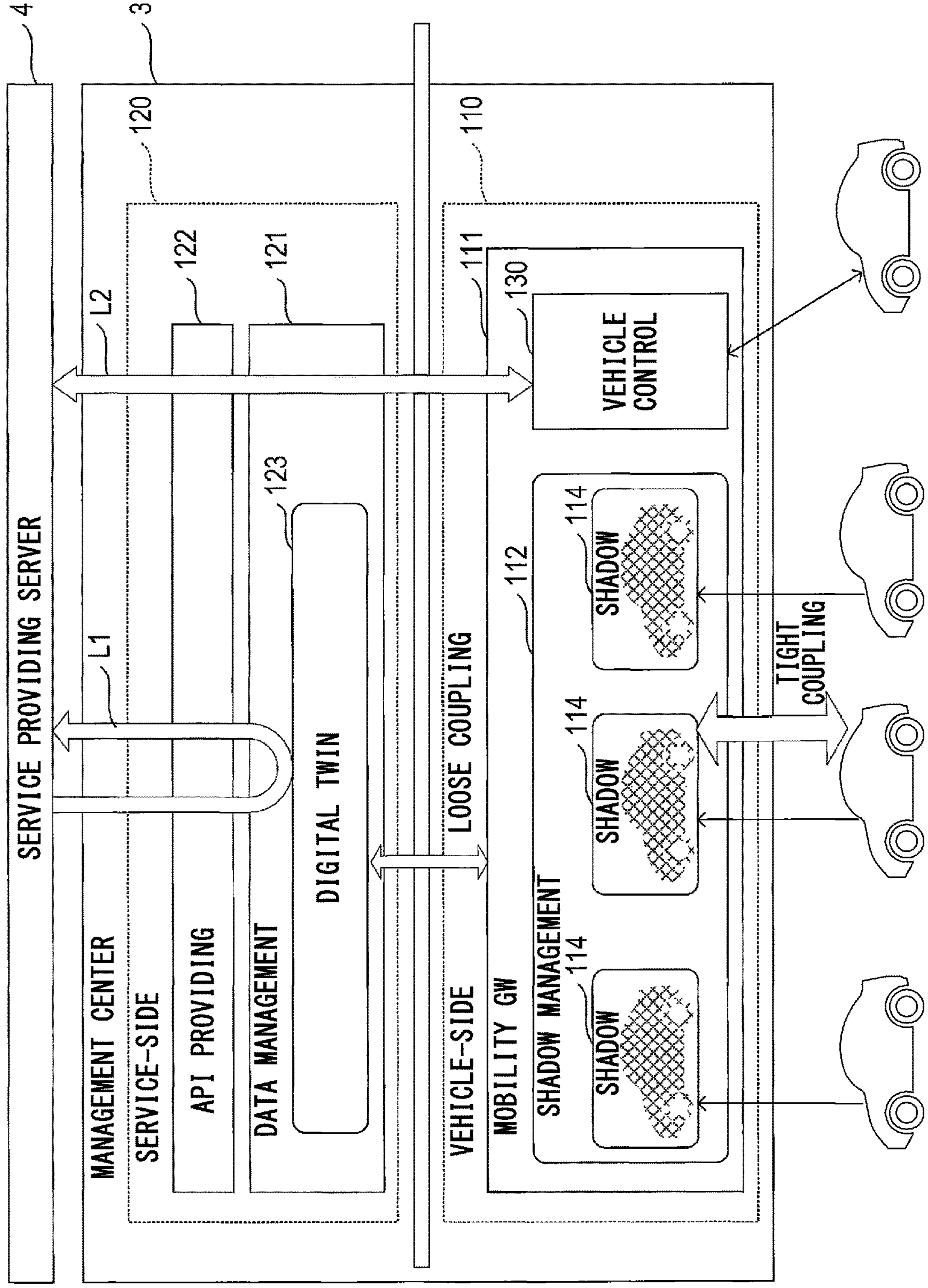
FIG. 11 is a functional block diagram illustrating a functional configuration of a management center.

As illustrated in FIG. 11, the management center 3 includes a vehicle-side unit 110 and a service-side unit 120 as functional blocks implemented by the CPU 41 executing a program stored in the ROM 42. The functional block close to the access to the vehicle is the vehicle-side unit 110, and the functional block close to the access from the service providing server 4 is the service-side unit 120. These two functional blocks are configured to be loosely coupled.

A method for realizing these elements constituting the management center 3 is not limited to software, and some or all of the elements may be realized by using one or a plurality of pieces of hardware. For example, in a case where the above-described function is implemented by an electronic circuit which is hardware, the electronic circuit may be realized by a digital circuit including a large number of logic circuits, an analog circuit, or a combination thereof.

The vehicle-side unit 110 has a function of managing access to the vehicle and data received from the vehicle. The vehicle-side unit 110 includes a mobility gateway (hereinafter, the mobility GW) 111. The mobility GW 111 has a function of managing data received from the vehicle in addition to a function of relaying an access request to the vehicle to the vehicle.

The mobility GW 111 includes a shadow management unit 112 and a vehicle control unit 130. The shadow management unit 112 has a function of managing a shadow 114 containing vehicle data provided for each vehicle on which the edge device 2 is mounted. The shadow 114 indicates a vehicle data group of a certain vehicle. The shadow 114 is generated based on the standardized vehicle data transmitted from the edge device 2. The vehicle control unit 130 has a function of controlling the vehicle on which the edge device 2 is mounted via the edge device 2 in accordance with an instruction from the service providing server 4.

The service-side unit 120 receives a request from the service providing server 4 and provides vehicle data. The service-side unit 120 includes a data management unit 121 and an API providing unit 122. API stands for Application Programming Interface.

The data management unit 121 has a function of managing a digital twin 123, which is a virtual space for providing vehicle access independent of a change in the connection state of the vehicle. The data management unit 121 manages data necessary for accessing vehicle data managed by the vehicle-side unit 110.

The API providing unit 122 is a standard interface for the service providing server 4 to access the mobility GW 111 and the data management unit 121. The API providing unit 122 provides the service providing server 4 with an API for accessing a vehicle and acquiring vehicle data.

[3-2-1. Data Accumulation Function]

Figure 12:
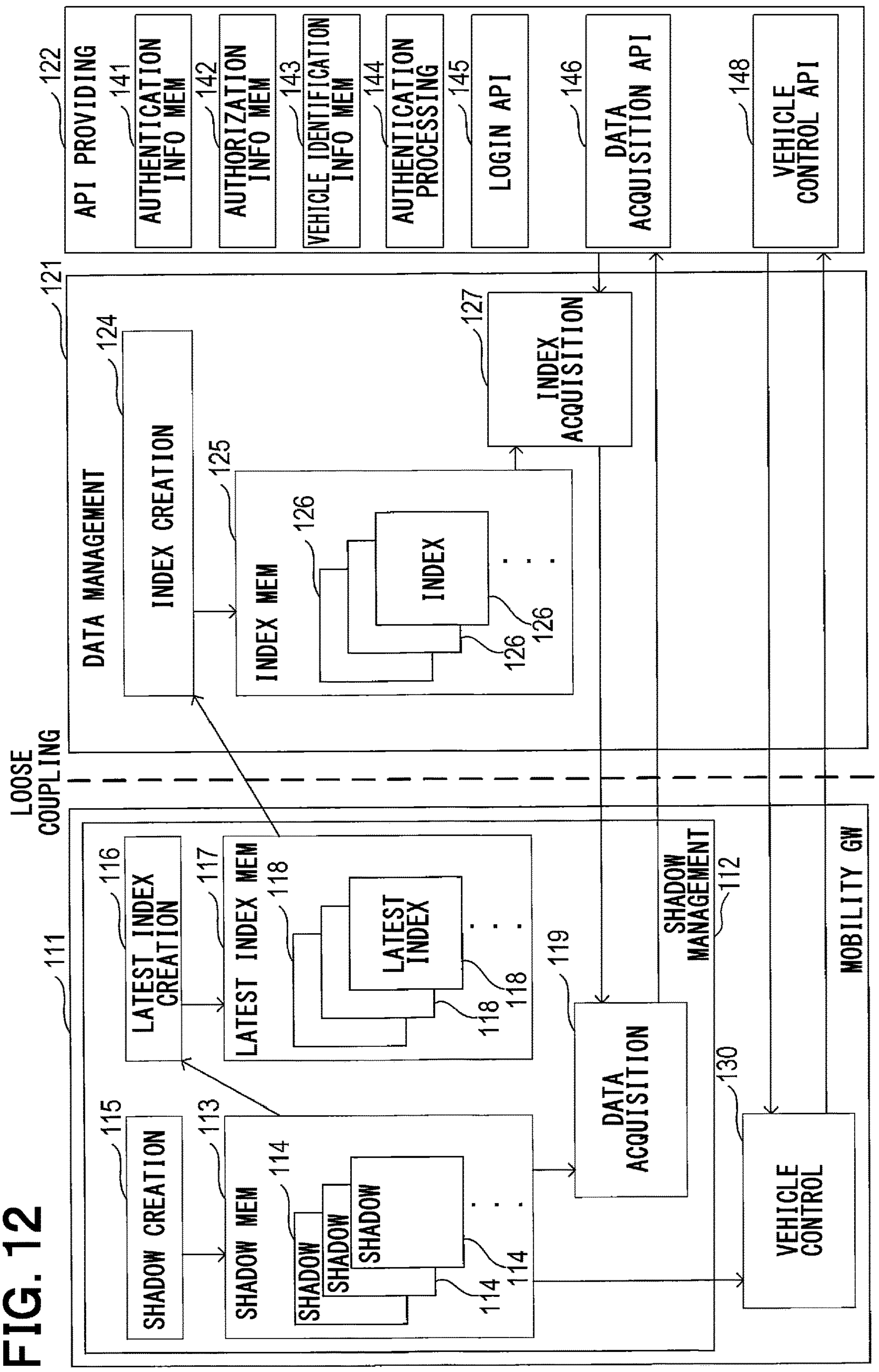
FIG. 12 is a functional block diagram illustrating functional configurations of a mobility GW and a data management unit.

As illustrated in FIG. 12, the shadow management unit 112 includes a shadow creation unit 115, a shadow memory unit 113, a latest index creation unit 116, and a latest index memory unit 117 as a configuration for realizing a function of accumulating vehicle data acquired from the edge device 2.

The shadow creation unit 115 receives the structured standardized vehicle data from the edge device 2. Every time the vehicle data is transmitted from the edge device 2, the shadow creation unit 115 updates the standardized vehicle data by overwriting the corresponding area of the structured standardized vehicle data with the transmitted vehicle data. The shadow creation unit 115 may receive a portion of the structured standardized vehicle data. The shadow creation unit 115 creates a new shadow 114 using the updated standardized vehicle data. The shadow creation unit 115 accumulates the created shadow 114 in the shadow memory unit 113. When creating a new shadow 114 using the updated standardized vehicle data, the shadow creation unit 115 may add any information such as a serial number and store the information in the shadow memory unit 113. The shadow memory unit 113 stores a plurality of shadows 114 created in time series for each vehicle. That is, the shadow 114 can be regarded as a copy of a state at a certain time of the vehicle on which the edge device 2 is mounted.

One shadow 114 is a vehicle data group of a certain vehicle at a predetermined time, and includes a vehicle data group represented by the standardized data structure illustrated in FIG. 13. Note that the timing at which the shadow creation unit 115 receives the structured standardized vehicle data via the communication unit 32 varies depending on the vehicle. The new shadow 114 may be created for all the vehicles at the same timing. The shadow creation unit 115 may create a new shadow 114 for all the vehicles at a constant cycle. The shadow memory unit 113 accumulates past shadow 114 for each vehicle. The shadow 114 after a certain period may be sequentially deleted.

As illustrated in FIG. 13, shadow 114 includes a vehicle data storage unit **114*a* and a device data storage unit 114*b***.

The vehicle data storage unit **114*a* stores "object-id", "Shadow_version", and "mobility-data" as data related to the vehicle on which the edge device 2** is mounted.

The "object-id" is a character string for identifying the vehicle on which the edge device 2 is mounted, and functions as a partition key.

The "Shadow_version" is a numerical value indicating a version of shadow 114, and a time stamp indicating a creation time is set every time shadow 114 is created.

The "mobility-data" is the above-described standardized vehicle data.

The device data storage unit **114*b* stores "object-id", "update_time", "version", "power_status", "power_status_timestamp", and "notify_reason" as data regarding hardware, software, mounted on the edge device 2**, and a state.

The "object-id" is the same as that described in the vehicle data storage unit **114*a***.

The "update_time" is a numerical value indicating an update time.

The "version" is a character string indicating versions of hardware and software of the edge device 2.

The "power_status" is a character string indicating the system state of the edge device 2. Specifically, there are a "power on" state in which all functions are available, and a "power off" state in which some functions are stopped and low power consumption is achieved.

The "power_status_timestamp" is a numerical value indicating the notification time of the system state.

The "notify_reason" is a character string indicating a notification reason.

As described above, the shadow 114 includes information about the edge device 2 in addition to the vehicle data group. Note that the device data storage unit **114*b* may store the information about the edge device 2 in the ROM 42 or the like separately without including the information about the edge device 2 in the shadow 114. The device data storage unit 114*b* may store only the latest data in the ROM 42 or the like instead of accumulating the past data for each time stamp as the information about the edge device 2**.

The "version", "power_status", "notify_reason", and the like stored in the device data storage unit **114*b* are notified from the edge device 2** when a change occurs, separately from the standardized vehicle data.

The latest index creation unit 116 acquires the latest shadow 114 for each vehicle from the shadow memory unit 113, and creates the latest index 118 using the acquired shadow 114. Then, the latest index creation unit 116 stores the created latest index 118 in the latest index memory unit 117. The latest index memory unit 117 stores one latest index 118 for each vehicle (that is, for each object-id).

As illustrated in FIG. 14, the latest index 118 stores "gateway-id", "object-id", "shadow-version", "vin", "location-Ion", "location-lat", and "location-alt".

The "object-id" and the "shadow-version" are similar to those described in the shadow 114.

The "gateway-id" is information for identifying the mobility GW 111. This is information for identifying a plurality of the management centers 3, for example, when the management centers 3 are provided for respective countries.

The "vin" is a registration number unique to the vehicle on which the edge device 2 is mounted.

The "location-lat" is information indicating the latitude at which the vehicle on which the edge device 2 is mounted is present.

The "location-Ion" is information indicating the longitude at which the vehicle on which the edge device 2 is mounted is present.

The "location-alt" is information indicating the altitude at which the vehicle on which the edge device 2 is mounted is present.

As illustrated in FIG. 12, the data management unit 121 includes an index creation unit 124 and an index memory unit 125 as a configuration that realizes a function of accumulating the latest index 118 acquired from the shadow management unit 112 as an index 126.

The index creation unit 124 acquires the latest index 118 from the latest index memory unit 117 according to a preset acquisition schedule, and creates the index 126 for the digital twin 123 using the acquired latest index 118. Then, the index creation unit 124 sequentially stores the created index 126 in the index memory unit 125. The index memory unit 125 stores a plurality of indexes 126 created in time series for each vehicle. That is, each of the indexes 126 stored in the index memory unit 125 represents a vehicle existing on the digital twin 123 which is a virtual time space.

As illustrated in FIG. 15, the index 126 stores "timestamp", "schedule-type", "gateway-id", "object-id", "shadow-version", "vin", "location", and "alt".

The "timestamp" is a timestamp indicating the time at which the index 126 is created in units of milliseconds.

The "schedule-type" indicates whether the scheduler of the data creation source is a periodic scheduler or an event. In a case where it is periodic, the "schedule-type" is set to "Repeat", and in a case where it is an event, the "schedule-type" is set to "Event".

The "gateway-id", the "object-id", the "shadow-version", and the "vin" are information taken over from the latest index 118.

The "location" is information taken over from the "location-Ion" and the "location-lat" of the latest index 118, and the "alt" is information taken over from the "location-alt" of the latest index 118.

Here, the shadow management unit 112 may have a configuration in which the latest index creation unit 116 and the latest index memory unit 117 are omitted. In this case, the index creation unit 124 may acquire the shadow 114 stored in the shadow memory unit 113 and generate the index 126. Preferably, the index creation unit 124 generates the index 126 by using the latest index 118 acquired from the latest index memory unit 117. This is one of configurations in which the mobility GW 111 and the data management unit 121 are loosely coupled.

Further, the data management unit 121 may have a configuration in which the index creation unit 124 and the index memory unit 125 are omitted. In this case, for example, the index acquisition unit 127 may request the data acquisition unit 119 to acquire the designated vehicle data using the object-id and the timestamp (that is, shadow-version) designated via the API providing unit 122.

[3-2-2. Service Providing Function]

As illustrated in FIGS. 5 and 12, the service-side unit 120 includes the API providing unit 122. The API providing unit 122 is an interface prepared for allowing an external service provider such as the service providing server 4 to use the function of the management center 3. Hereinafter, the user of the mobility IoT system 1 using the API providing unit 122 or the like is referred to as a service user. The service user is, for example, a service operator that performs home delivery to a vehicle trunk.

As illustrated in FIG. 12, the API providing unit 122 includes an authentication information memory unit 141, an authorization information memory unit 142, a vehicle identification information memory unit 143, and an authentication processing unit 144. In addition, a login API 145, a data acquisition API 146, and a vehicle control API 148 are included as types of APIs provided to the service user.

The login API 145 is an API provided for authenticating the service user. The data acquisition API 146 is an API provided for a service user to acquire data. The vehicle control API 148 is an API provided for the service user to control the vehicle.

The authentication information memory unit 141 stores "authentication information" in association with the "service user ID". The "service user ID" is identification information for uniquely identifying the service user. The "authentication information" is information for authenticating the service user himself/herself, and is, for example, a password set in advance.

The authorization information memory unit 142 includes an authorization object database (hereinafter, an authorization object DB) and an authorization class DB.

As illustrated in FIG. 16, the authorization object DB stores an "authorization class", an "authorization object", and an "expiration date" in association with the "service user ID". The "authorization class" is information indicating a range of authority authorized for the service user. The "authorization object" is a list of "object-ids" of a vehicle that is allowed to be accessed by the service user. The "expiration date" is the start date and the end date of the period in which the registration content is valid. That is, the authorization object DB is a database indicating registration content regarding the authority of each service user with respect to the mobility IoT system 1. In the authorization object DB, a plurality of registrations may be performed for one service user as long as the "authorization objects" are different or the "expiration dates" do not overlap.

As illustrated in FIG. 17, the authorization class DB stores "API information", "acquisition authority", and "expiration date" in association with the "authorization class". The authorization class DB is a database representing specific content of the "authorization class".

The "authorization class" is information for identifying a plurality of classes representing a data range to be authorized, and for example, there may be six classes of "open", "Class0", "class1", "class2", "class3", and "Full" in ascending order of the authorization class. The "authorization class" is not limited to classification of a data range in which data can be read or written, and may be classification of an operation control range in which operation can be controlled.

The "API information" is a url of the API provided to the service user of the corresponding "authorization class". url stands for Uniform Resource Locator.

The "acquisition authority" is a list of acquirable data permitted for the corresponding "authorization class" service user. When the authorization class is "open", the data included in the "acquisition authority" is limited to information that is allowed to be freely accessed by anyone, and may include, for example, position information and altitude information about the vehicle. When the authorization class is "Full", the data included in the "acquisition authority" includes all the information managed by the management center 3 and all the information that is allowed to be acquired from the vehicle on which the edge device 2 is mounted. In a case where the authorization class is "Class0" to "Class3", the number of accessible data may be set to increase as the class increases to 0 to 3, or the type of accessible data may be set to be different for each class.

Here, the acquirable data is listed as the acquisition authority, but instead of the acquirable data or in addition to the acquirable data, the available function, for example, the type of control for the vehicle on which the edge device 2 is mounted, and the like may be listed. The acquirable data is listed from the data items illustrated in FIG. 7, for example.

When the "expiration date" does not overlap, there may be a plurality of settings in one "authorization class".

The vehicle identification information memory unit 143 stores table information in which "object-id" uniquely assigned to the vehicle on which the edge device 2 is mounted is associated with "vin" of the vehicle.

The authentication processing unit 144 executes an authentication process when an authentication request is made via the login API 145, and executes an authorization process when an access request is made via the data acquisition API 146 and the vehicle control API 148. The authentication process and the authorization process will be described later.

Figure 18:
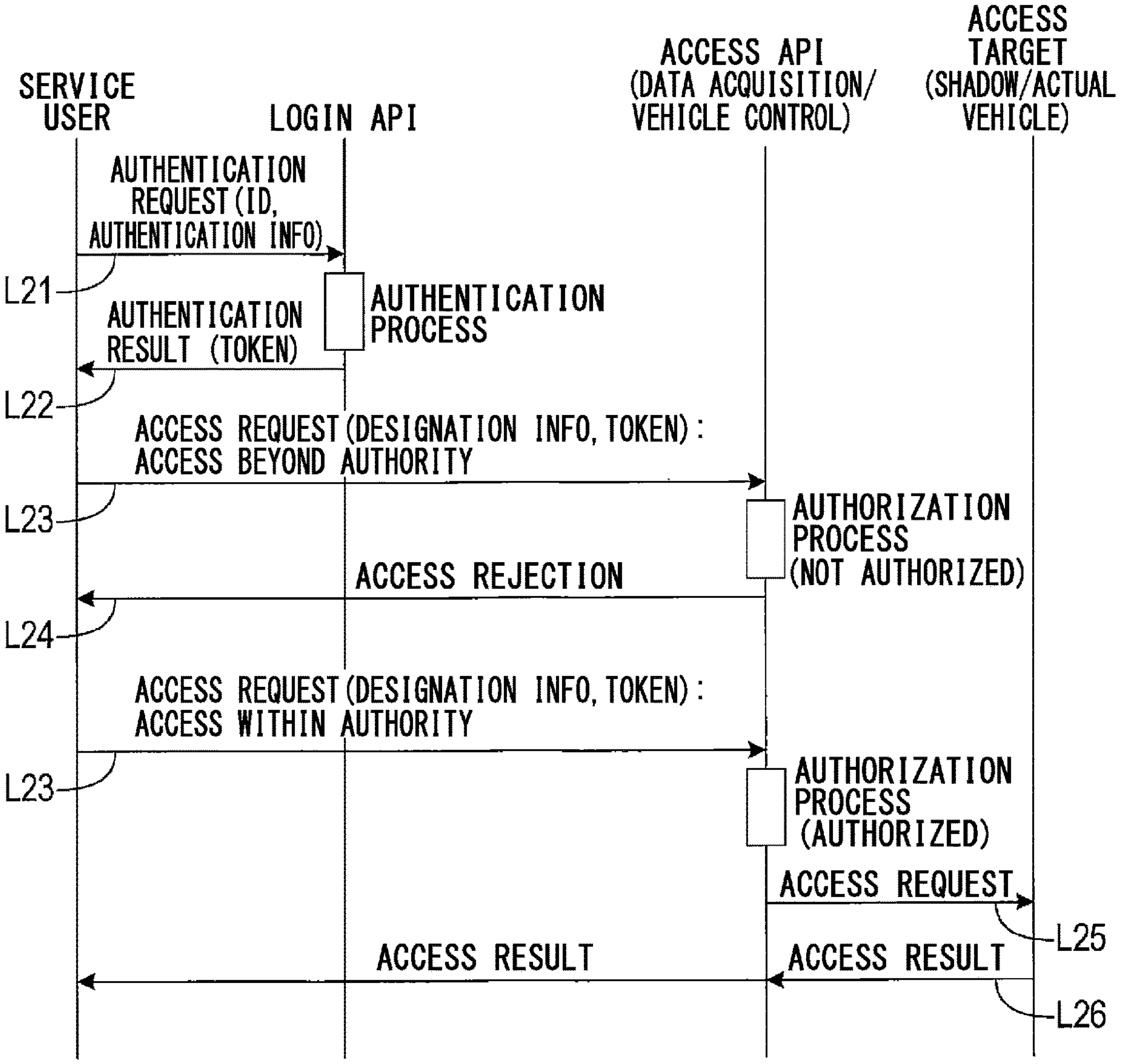
FIG. 18 is a sequence diagram illustrating an operation of an API providing unit.

A procedure related to an access request via the API providing unit 122 will be described with reference to FIG. 18.

The login API 145 is used when the service user logs in to the mobility IoT system 1.

As indicated by an arrow L21, when the login API 145 receives an authentication request from the service user, the authentication processing unit 144 executes an authentication process. In the authentication process, the "service user ID" and the "authentication information" input by the login API 145 are collated with the registration content of the authentication information memory unit 141. As a result of the collation, in a case where the information is matched, that is, in a case where the authentication is successful, as indicated by an arrow L22, a token which is data serving as a certificate for permitting access to the mobility IoT system 1 is returned as the authentication result.

The data acquisition API 146 is an API used for accessing the vehicle data (that is, index 126 and shadow 114) accumulated in the management center 3 as indicated by L1 in FIG. 11. As indicated by L2 in FIG. 11, the vehicle control API 148 is an API used for accessing the vehicle on which the edge device 2 is mounted.

Hereinafter, the data acquisition API 146 and the vehicle control API 148 are collectively referred to as an access API. As indicated by an arrow L23 in FIG. 18, when the access API receives an access request from a service user, the authentication processing unit 144 executes an authorization process.

When the authorization process is executed, the authentication processing unit 144 identifies the "service user ID" from the "token" added to the access request. Next, the authentication processing unit 144 searches the authorization object DB of the authorization information memory unit 142 to identify the "authorization class" and the "authorization object" of the identified "service user ID". Further, the authentication processing unit 144 determines whether the vehicle to be accessed indicated in the access request is indicated in the "authorization object", that is, whether access to the vehicle designated by the service user is permitted. In addition, the authentication processing unit 144 refers to the authorization class DB and determines whether the access API used for the access request is included in the "API information" of the designated "authorization class", that is, whether use of the API designated by the service user is permitted. Further, the authentication processing unit 144 refers to the authorization class DB and determines whether the instruction content indicated in the access request is within the range of the "acquisition authority" of the identified "authorization class", that is, whether access to the instruction content requested by the service user is permitted. Then, in a case where the vehicle to be accessed is not indicated in the "authorization object", in a case where the access API is not included in the "API information", or in a case where the instruction content is out of the range of the "acquisition authority", the authentication processing unit 144 determines that the vehicle to be accessed is unauthorized. When it is determined as unauthorized, the authentication processing unit 144 notifies the service user of the access rejection via the access API as indicated by an arrow L24. When the vehicle to be accessed is indicated in the "authorization object", the access API is included in the "API information", and the instruction content is within the range of the "acquisition authority", the authentication processing unit 144 determines that the vehicle is authorized. In a case where it is determined as authorized, the authentication processing unit 144 transfers the access request to the shadow 114 or the real vehicle to be accessed as indicated by an arrow L25. Thereafter, as indicated by an arrow L26, the access result returned from the access target is provided to the service user via the access API.

In the access API, either "object-id" or "vin" may be used as the information for identifying the vehicle. When "vin" is used, "vin" may be converted into "object-id" with reference to vehicle identification information memory unit 143.

As illustrated in FIG. 12, the management center 3 includes an index acquisition unit 127, a data acquisition unit 119, and a vehicle control unit 130 as a configuration for realizing the access request via the access API. The index acquisition unit 127 implements a function of acquiring data from the index 126 accumulated in the index memory unit 125. Data acquisition unit 119 implements a function of acquiring data from shadow 114 accumulated in shadow memory unit 113. The vehicle control unit 130 implements a function of accessing the vehicle on which the edge device 2 is mounted using the communication function with the edge device 2.

That is, the access request (hereinafter, the data acquisition request) input via the data acquisition API 146 is processed by the index acquisition unit 127. In addition, the access request (hereinafter, vehicle control request) input via the vehicle control API 148 is processed by the vehicle control unit 130.

[3-3. Data Acquisition Process]

A data acquisition process, which is a series of processes executed when the data acquisition API 146 receives the data acquisition request, will be described. Specifically, it is a data acquisition process when an access request is transmitted from the access API to the access target after the authentication process and the authorization process are performed in FIG. 18. The data acquisition process is a process of acquiring designated data from the shadow 114 managed in the management center 3 using the data acquisition API 146.

First, the designation information included in the data acquisition request will be described. The designation information is set by the service user.

Figure 19:
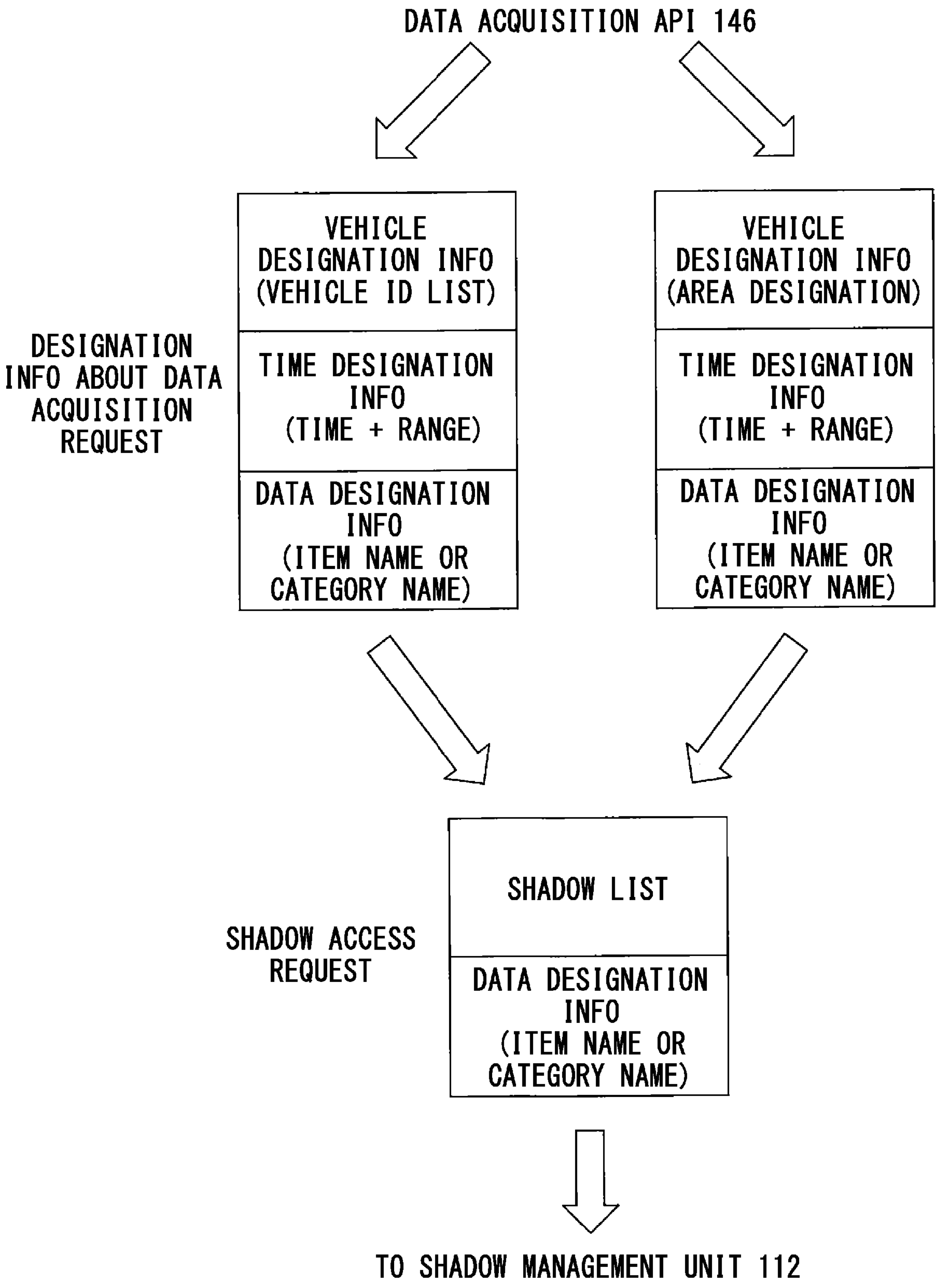
FIG. 19 is a diagram illustrating a configuration of designation information about a data acquisition request and a shadow access request.

As illustrated in FIG. 19, the designation information includes vehicle designation information, time designation information, and data designation information.

The vehicle designation information is information for designating a vehicle (hereinafter, target vehicle) from which data is to be acquired. The vehicle designation information includes a method of listing vehicle IDs (that is, object-id or yin) of target vehicles in a list form and a method of designating (hereinafter, area designation) a geographical area where the target vehicles are present. In addition, the target vehicle may be designated by a vehicle type, a model, or the like.

As illustrated in FIG. 20, there are three types of area designation methods: rectangle designation, polygon designation, and neighborhood designation. The rectangle designation is a method of designating a rectangular geographical area by upper left corner coordinates and lower right corner coordinates. The coordinates are represented using latitude and longitude. The polygon designation is a method of identifying a geographical area of a polygon by coordinates of n vertices of the polygon. The neighborhood designation is a method of designating a circular geographical area by the center coordinates and a distance from the center coordinates.

Returning to FIG. 19, the time designation information is information for designating a timing at which data is generated. The time designation information is represented by a starting time and a range. The range is, for example, a value in which a time width is represented by an integer of 1 or more with a generation cycle of the latest index 118 as a unit time.

The data designation information is information for designating data to be acquired. The data designation information may represent the item name of the data indicated in the standardized vehicle data in a list form, or may be represented by designating the category name indicated in the standardized vehicle data. When the category name is designated, all items belonging to the category are designated. In addition, in a case where neither the item name nor the category name is designated, all the items are designated. The data that is allowed to be designated by the item name may include raw data that is not included in the standardized vehicle data. For example, the data designation information may include a CANID of a CAN frame associated with raw data.

Note that the way of setting the vehicle designation information, the time designation information, and the data designation information described here is an example, and the method is not limited to the above method.

Next, the shadow list generation process executed by the index acquisition unit 127 when the data acquisition API 146 receives the data acquisition request will be described with reference to a flowchart of FIG. 21.

In S110, the index acquisition unit 127 refers to the vehicle designation information indicated in the data acquisition request, and when the designation information is the vehicle ID list, the process proceeds to S120, and when the designation information is the area designation, the process proceeds to S130.

In S120, the index acquisition unit 127 refers to the index memory unit 125 to extract all the indexes 126 having the "object-id" indicated in the vehicle ID list and having the "timestamp" within the time range indicated by the time designation information, and advances the process to S150.

In S130, the index acquisition unit 127 sets a search area for searching for the target vehicle according to the area designation indicated in the designation information.

In subsequent S140, the index acquisition unit 127 refers to the index memory unit 125, extracts all the indexes 126 having the "location" in the search area set in S130 and having the "timestamp" within the time range indicated by the time designation information, and advances the process to S150.

In S150, the index acquisition unit 127 generates shadow identification information in which the "object-id" and the "shadow-version" indicated by the index 126 are combined for each of the indexes 126 extracted in S120 or S140. The generated shadow identification information is a component of a shadow identification information list (hereinafter, the shadow list) listing the shadow identification information.

In subsequent S160, the index acquisition unit 127 outputs a shadow access request in which the data designation information indicated in the data acquisition request is added to the shadow list generated in S150 to the data acquisition unit 119 of the shadow management unit 112, and ends the process.

Figures 22, 23:
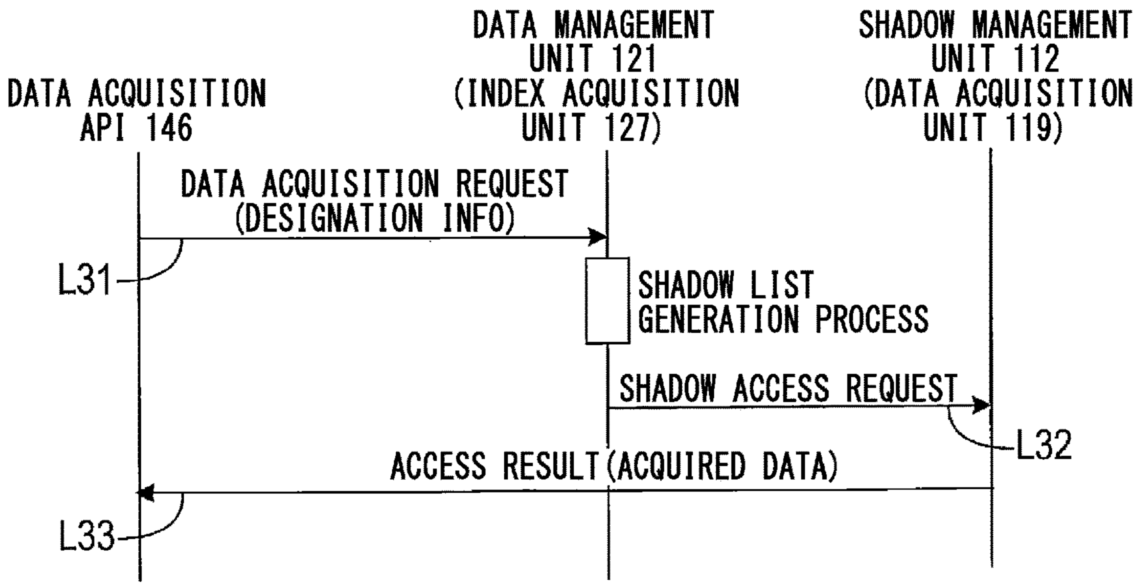
FIG. 22 is a sequence diagram illustrating a procedure of data acquisition using a data acquisition API.
FIG. 23 is a diagram illustrating a configuration of designation information about a vehicle control request.

As illustrated in FIG. 22, when receiving a data acquisition request from the data acquisition API 146 as indicated by an arrow L31, the index acquisition unit 127 generates a shadow list. The shadow list is generated according to the acquisition condition using the vehicle designation information and the time designation information indicated in the data acquisition request as the acquisition condition. In addition, as indicated by an arrow L32, the index acquisition unit 127 outputs a shadow access request in which the generated shadow list and the data designation information are combined to the data acquisition unit 119.

When the shadow access request from the index acquisition unit 127 is input, the data acquisition unit 119 refers to the shadow memory unit 113 and extracts the shadow 114 corresponding to each shadow identification information indicated in the shadow list of the shadow access request. Further, the data acquisition unit 119 extracts designation data, which is data indicated in the data designation information about the shadow access request, from each of the extracted shadows 114. As indicated by an arrow L33, the data acquisition unit 119 returns the extracted designation data as an access result to the data acquisition API 146 as a request source.

[3-4. Vehicle Control Process]

A vehicle control process, which is a series of processes executed when the vehicle control API 148 receives a vehicle control request from a service user, will be described. The vehicle control process is a process of designating a vehicle and requesting control to the designated vehicle (hereinafter, target vehicle). The process of requesting control may be, for example, a process of requesting operation of the in-vehicle device or a process of requesting acquisition of data stored in the edge device 2 or the ECUs 210, 220, 230.

First, the designation information included in the vehicle control request will be described.

As illustrated in FIG. 23, the designation information designated by the service user includes vehicle designation information, execution target information, control designation information, priority information, time limit information, and vehicle authentication information.

One vehicle ID is indicated in the vehicle designation information. The vehicle identified from the vehicle ID is the target vehicle. The vehicle ID corresponds to the above-described yin or object-id.

The execution target information is information for designating which application mounted on the target vehicle is to execute the control content indicated in the control designation information, and indicates an application ID for identifying the application.

The control designation information indicates content of specific control to be executed by the target vehicle. For example, key operations of various doors such as each seat door and a trunk door, operations of acoustic equipment such as a horn and a buzzer, operations of various lamps such as a head lamp and a hazard lamp, and operations of various sensors such as a camera and a radar may be included. The control designation information may include information indicating what kind of operation is to be performed by which device. In the control designation information, one control may be indicated, or a plurality of controls executed continuously may be indicated in the list form. Note that it is assumed that the control indicated in the list format is required to be executed in the order of the list. Further, the control designation information may include an operation of acquiring data stored in the edge device 2 or the ECUs 210, 220, 230.

The priority information indicates a priority when a control instruction generated based on the vehicle control request is transmitted toward the target vehicle. Here, the high priority and the low priority are set in two levels. The priority information may be set by a service user as a request source, or may be automatically set according to the content of control indicated in the control designation information. In addition, the vehicle control API 148 may set the priority based on a predetermined rule.

The time limit information indicates the final time at which control in the target vehicle is allowed. The time limit information is set up to, for example, +10 minutes from the time when the vehicle control request is input. As in the priority information, the time limit information may be set by a service user as a request source, or may be automatically set according to the content of control requested to the vehicle. In addition, the vehicle control API 148 may set the control time information based on a predetermined rule.

The vehicle authentication information is information used to determine whether the target vehicle may receive the control instruction, and includes an owner ID and a password for identifying the owner of the target vehicle. The vehicle authentication information is held in the vehicle, and is also held by a service user who is permitted to access the vehicle. In the case of the share car, the vehicle authentication information may be constituted by a user ID and a password for identifying the user of the target vehicle.

Figure 24:
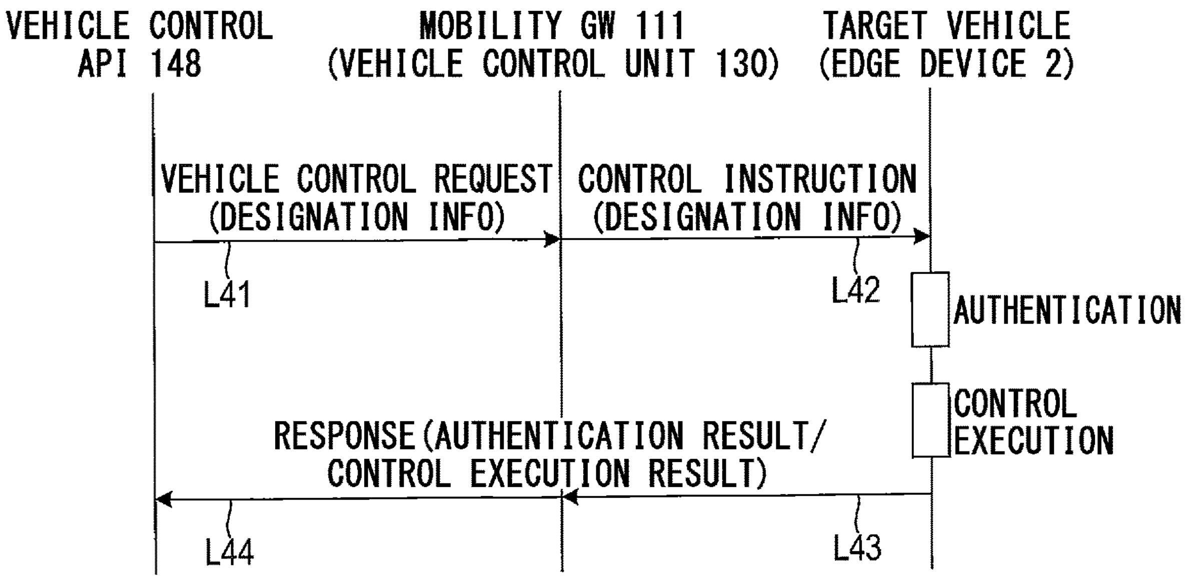
FIG. 24 is a sequence diagram illustrating a typical operation when a vehicle control request is received.

As illustrated in FIG. 24, when a vehicle control request is input from the vehicle control API 148 as indicated by an arrow L41, the vehicle control unit 130 transmits one or a plurality of control instructions generated based on the vehicle control request to the target vehicle as indicated by an arrow L42. FIG. 24 illustrates a case where one control instruction is transmitted for simplicity. The vehicle control unit 130 executes relay control in response to the control instruction. The relay control includes, for example, control for improving reliability of vehicle control realized by access to the target vehicle.

When receiving the control instruction from the management center 3, the edge device 2 mounted on the vehicle collates the vehicle authentication information indicated by the control instruction with the vehicle authentication information about the host vehicle to perform authentication.

When the authentication fails, the edge device 2 transmits a response including a notification indicating the failure to the management center 3.

When the authentication is successful, the edge device 2 causes the application identified from the implementation target information to execute the control indicated in the control designation information. The application requests the ECU 210 to execute control in accordance with the control designation information. The ECU 210 requests the ECUs 220, 230 to be controlled to execute control. In addition, as indicated by an arrow L43, the edge device 2 transmits a response including the execution result of the control to the management center 3.

Upon receiving the response, the vehicle control unit 130 returns the response content to the vehicle control API 148 as indicated by an arrow L44.

[3-5. Communication Control]

Communication control executed by the vehicle control unit 130 at the time of communication with the vehicle will be described.

Figure 25:
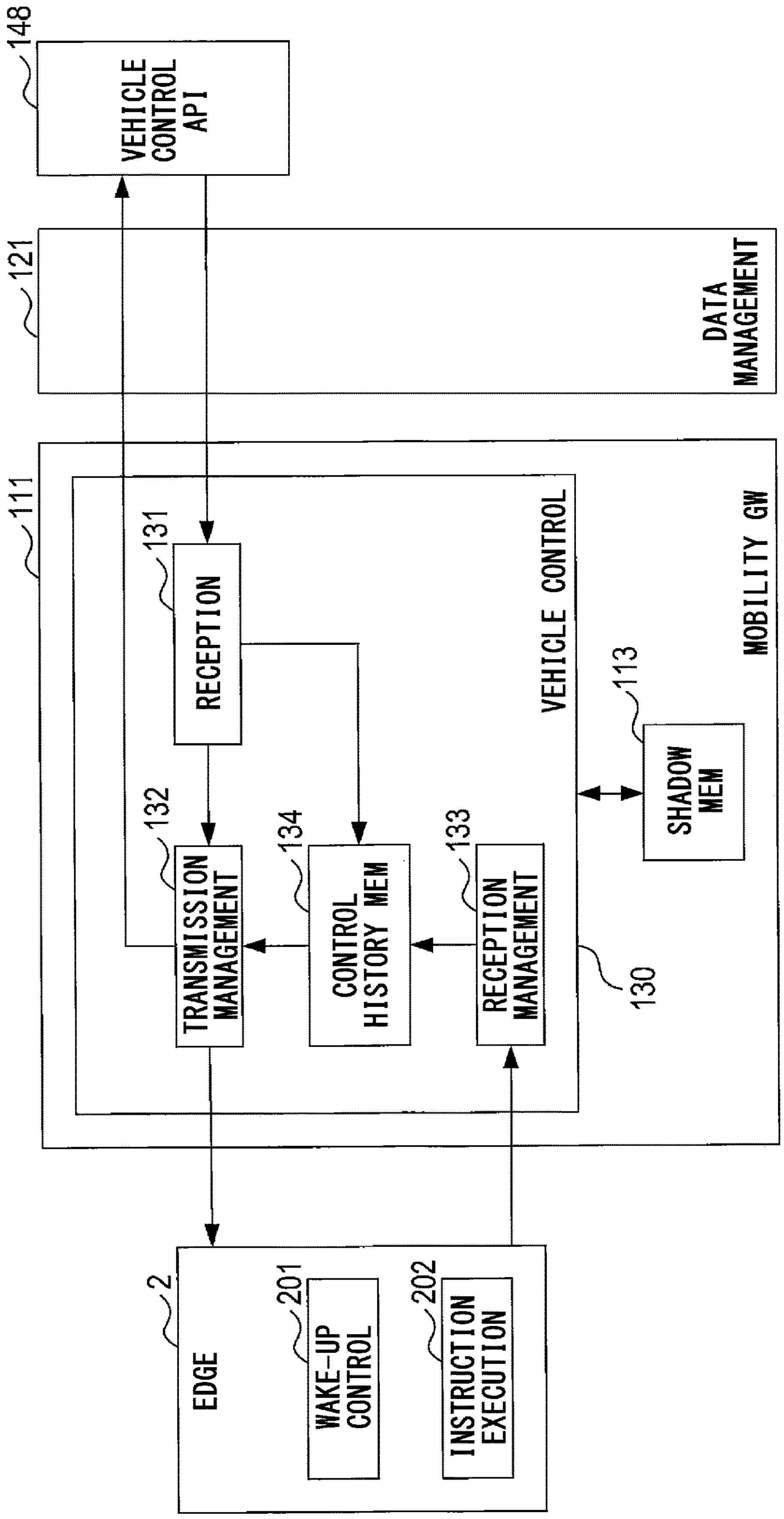
FIG. 25 is a diagram illustrating a configuration of a vehicle on which a vehicle control unit and an edge device related to a vehicle control request are mounted.

As illustrated in FIG. 25, the vehicle control unit 130 includes a reception unit 131, a transmission management unit 132, a reception management unit 133, and a control history memory unit 134.

The control history memory unit 134 stores history data of control instructions to be transmitted to the vehicle. The history data includes an order ID and a control status in addition to part of the designation information indicated in the vehicle control request.

Figures 26, 27:
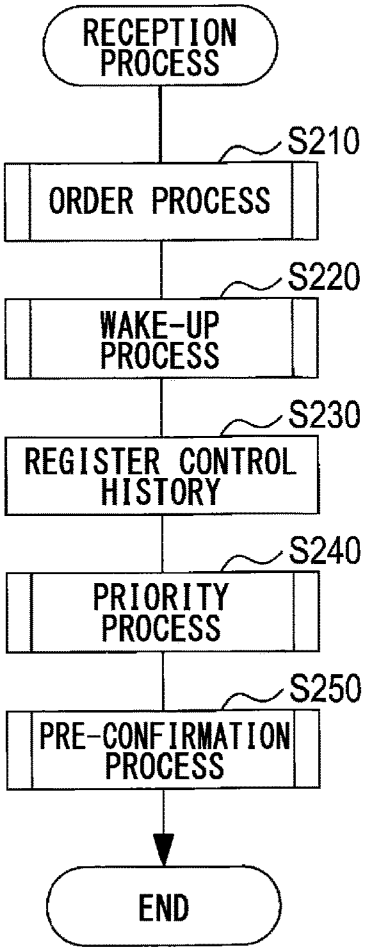
FIG. 26 is a diagram illustrating registration content in a control history memory unit.
FIG. 27 is a flowchart of a reception process executed by a reception unit.

As illustrated in FIG. 26, the designation information stored as the history data includes vehicle designation information, priority information, and control designation information. The order ID is a number serially assigned to history data (that is, the control instruction) registered in the control history memory unit 134. As the control status, a status defined in advance for the control instruction is listed, and a time stamp indicating a time at which a status changes to the corresponding status is stored in association with the status. The status includes a state in which a control instruction transmission request is received, a state in which a control instruction is transmitted, a state in which a response is received, and the like.

The reception unit 131, the transmission management unit 132, and the reception management unit 133 execute processing with reference to the shadow 114 of the target vehicle stored in the control history memory unit 134 and the shadow memory unit 113.

[3-5-1. Reception Process]

The reception process executed by the reception unit 131 when the vehicle control API 148 receives the vehicle control request will be described with reference to the flowchart of FIG. 27.

In S210, the reception unit 131 first executes an order process.

Figure 28:
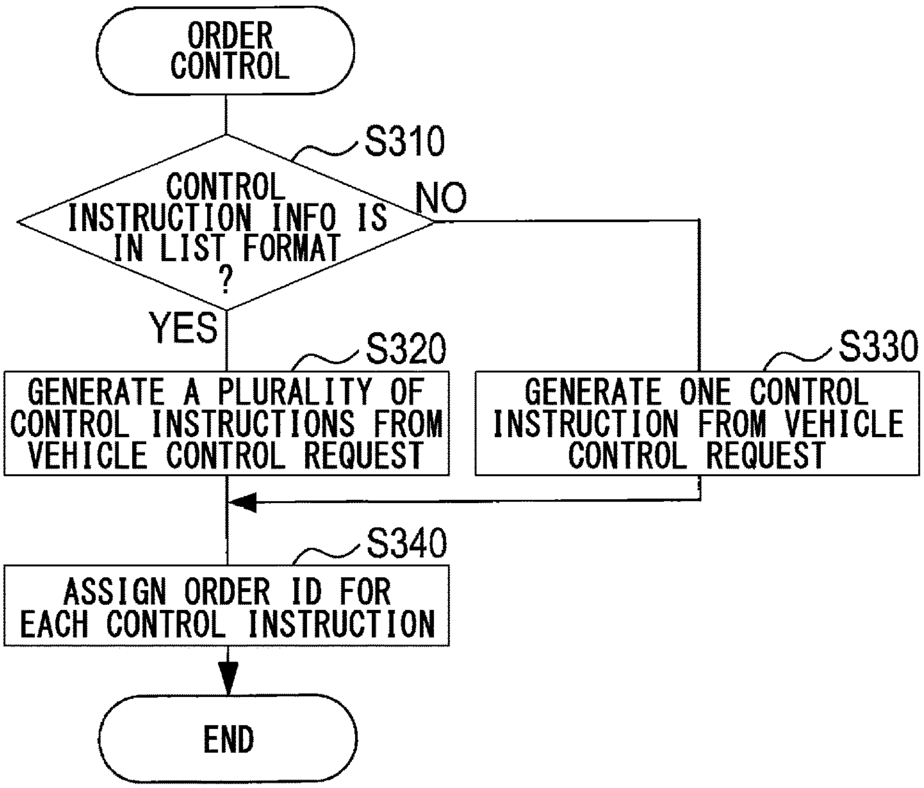
FIG. 28 is a flowchart of an order process executed in a reception process.

The order process will be described with reference to the flowchart of FIG. 28.

In S310, the reception unit 131 refers to the designation information about the vehicle control request to determine whether a plurality of controls is described in the control instruction information in the list form, and when the controls are described in the list form, the process proceeds to S320, and when one control is described, the process proceeds to S330.

In S320, the reception unit 131 generates a plurality of control instructions from the vehicle control request, and advances the process to S340. Specifically, when the number of controls indicated in the list form in the control instruction information is N, N control instructions are generated from one vehicle control request. In the generated N control instructions, a copy from the original vehicle control request is used for portions other than the control instruction information, and one control is indicated in the control instruction information.

In S330, the reception unit 131 generates one control instruction from the vehicle control request, and advances the process to S340. Specifically, the control instruction has content obtained by directly receiving designation information about the vehicle control request.

In S340, the reception unit 131 assigns an order ID to the control instruction, and ends the process. Basically, serial numbers are assigned as order IDs in the order in which the control instruction is received. When a plurality of control instructions is generated from one vehicle control request in S320, order IDs are assigned to the plurality of control instructions in the order of control indicated in the control instruction information about the original vehicle control request.

Here, in the control instruction information, individual control designated in a list form is set as unit control. The unit control may be not only simple content such as "light on" and "light off", but also content such as "the horn is repeatedly turned on and off twice at intervals of 100 msec" and "the headlight is repeatedly turned on and off three times at intervals of 200 msec". That is, content identifying repetition of the same type of control including the interval information may be used as the unit control. Such a control instruction corresponds to a specific control instruction. Since the delay until each control instruction reaches the edge device 2 varies depending on the situation at that time, it is difficult to manage the control interval by the management center 3. However, in a case where repetition of the same control including the interval information is set as unit control, since the control interval is controlled by the vehicle, it is possible to faithfully reproduce the control intended by the service user by the vehicle. That is, for example, the edge device 2 transmits an instruction to turn on the horn to the ECU 210, waits for 100 msec, transmits an instruction to turn off the horn, waits for 100 msec, transmits an instruction to turn on the horn, waits for 100 msec, and transmits an instruction to turn off the horn.

Returning to FIG. 27, when the order process is completed, the reception unit 131 executes a wake-up process in subsequent S220.

Figure 29:
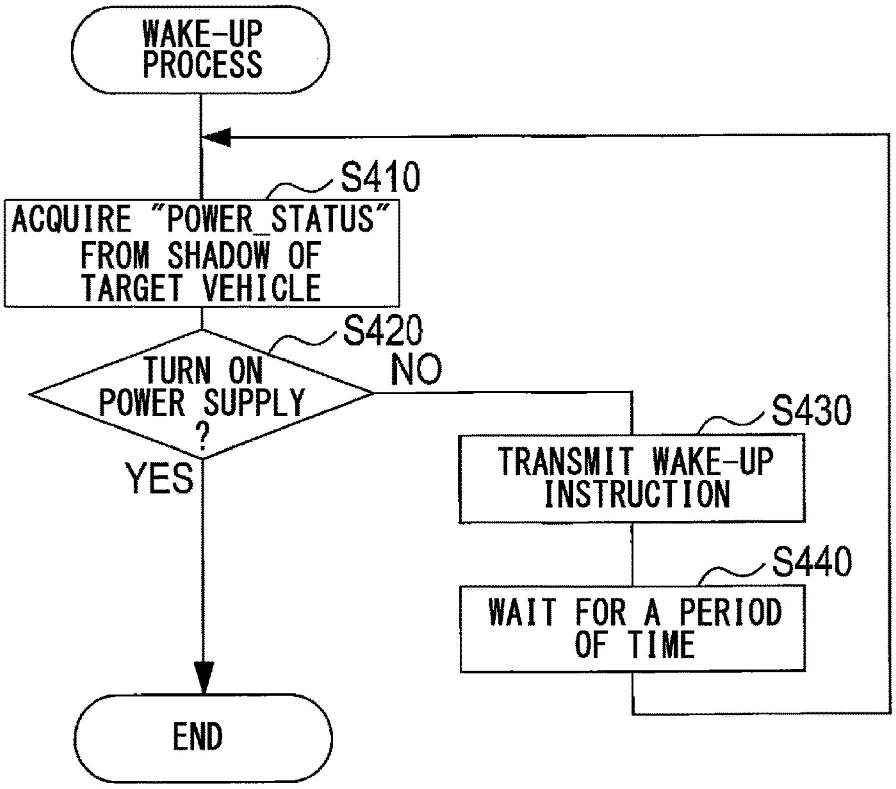
FIG. 29 is a flowchart of a wake-up process executed in a reception process.

Here, the wake-up process will be described with reference to the flowchart of FIG. 29.

In S410, reception unit 131 acquires "power_status" indicated by latest shadow 114 of the target vehicle from the shadow memory unit 113. From this "power_status", the power supply state of the edge device 2 can be seen.

In subsequent S420, the reception unit 131 determines whether "power_status" is power-on. When the power is on, the reception unit terminates the process. When the power is not on but is off, the reception unit shifts the process to S430.

In S430, the reception unit 131 transmits a wake-up instruction to the edge device 2 of the target vehicle. When receiving the wake-up instruction, the edge device 2 transitions from a power-off or sleep state to a power-on or wake-up state.

In subsequent S440, the reception unit 131 waits for a certain period of time (for example, one second), and returns the process to S410.

That is, in a case where the "power_status" is the power-off state, the wake-up instruction is transmitted to transition all the functions of the edge device 2 to the available wake-up state. The management center 3 is notified of the state change by a response to a wake-up instruction from the vehicle or periodic transmission of vehicle data from the vehicle, so that "power_status" of the shadow 114 of the target vehicle is updated to be powered on.

Note that the vehicle control unit 130 may be configured to issue a power supply control instruction to devices other than the edge device 2 with reference to the latest "mobility_data" (that is, the standardized vehicle data) of the shadow 114. For example, when the ignition power supply of the target vehicle is off, an ignition power-on instruction is transmitted to an electronic control device that controls the power supply via the edge device 2. In addition, in a case where the power of the camera mounted on the target vehicle and photographing the outside or the inside of the vehicle is turned off, the camera activation instruction is transmitted via the edge device 2. As described above, by transmitting the preliminary instruction to the target vehicle, the vehicle control request received by the reception unit 131 can be reliably executed by the edge device 2.

Returning to FIG. 27, when the wake-up control ends, in subsequent S230, the reception unit 131 registers the control instruction in the control history memory unit 134 as history data. The control status at the time of registration is set to "Accept" indicating that control has been received.

In subsequent S240, the reception unit 131 executes the priority process and ends the process.

Figure 30:
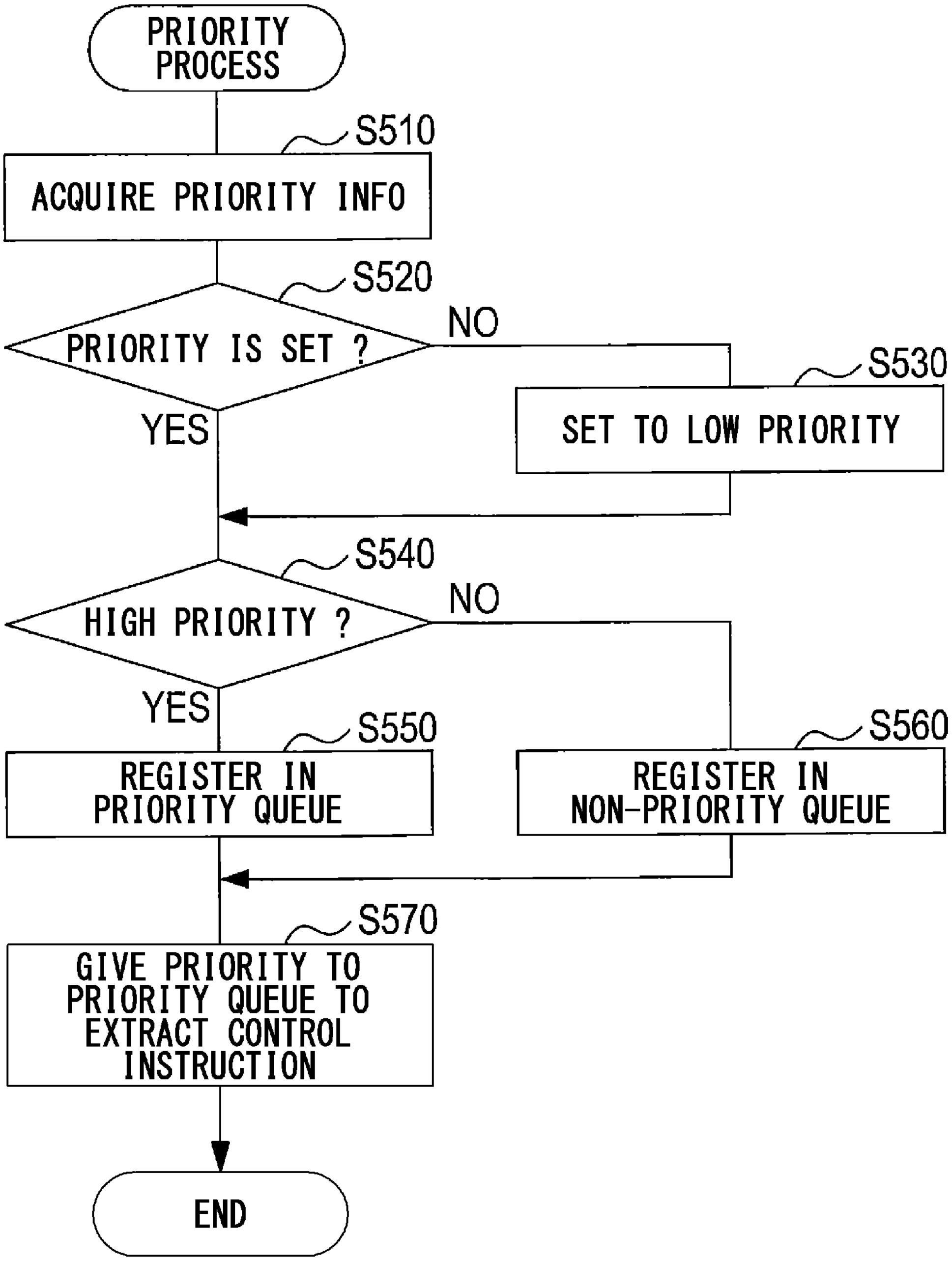
FIG. 30 is a flowchart of a priority process executed in a reception process.

Here, the priority process will be described with reference to the flowchart of FIG. 30.

In S510, the reception unit 131 acquires the priority information about the control instruction to be processed. The priority information is set as designation information about the vehicle control request as illustrated in FIG. 23, and is registered in the control history memory unit 134 in association with the control instruction as illustrated in FIG. 26.

In subsequent S520, the reception unit 131 determines whether there is a priority setting in the acquired priority information, and when there is a priority setting, the process proceeds to S540, and when there is no priority setting, the process proceeds to S530.

In S530, the reception unit 131 sets the priority information to the low priority and shifts the process to S540. For example, in a case where there are three or more levels of priority, a value of the lowest priority is set.

In S540, the reception unit 131 determines whether the setting of the priority information is the high priority, and when the setting is the high priority, the process proceeds to S550, and when the setting is not the high priority but the low priority, the process proceeds to S560. For example, it may be determined that the priority is high in a case where the priority is set, or it may be determined that the priority is high in a case where the value of the priority is a predetermined threshold value or more.

In S550, the reception unit 131 registers the control instruction in the priority queue, and advances the process to S570. The queue is a buffer having a data structure in which data can be extracted in writing order.

In S560, the reception unit 131 registers the control instruction in the non-priority queue, and advances the process to S570.

In S570, the reception unit 131 gives priority to the priority queue, and extracts the control instruction from the priority queue and the non-priority queue in order, passes the extracted control instruction to the transmission management unit 132, and ends the process. When referring to prioritizing the priority queue, for example, data may be extracted from the priority queue as long as data remains in the priority queue, and data may be extracted from the non-priority queue only when there is no data in the priority queue. In addition, the data may be extracted at a higher ratio from the priority queue than from the non-priority queue.

[3-5-2. Transmission-Side Process]

Figure 31:
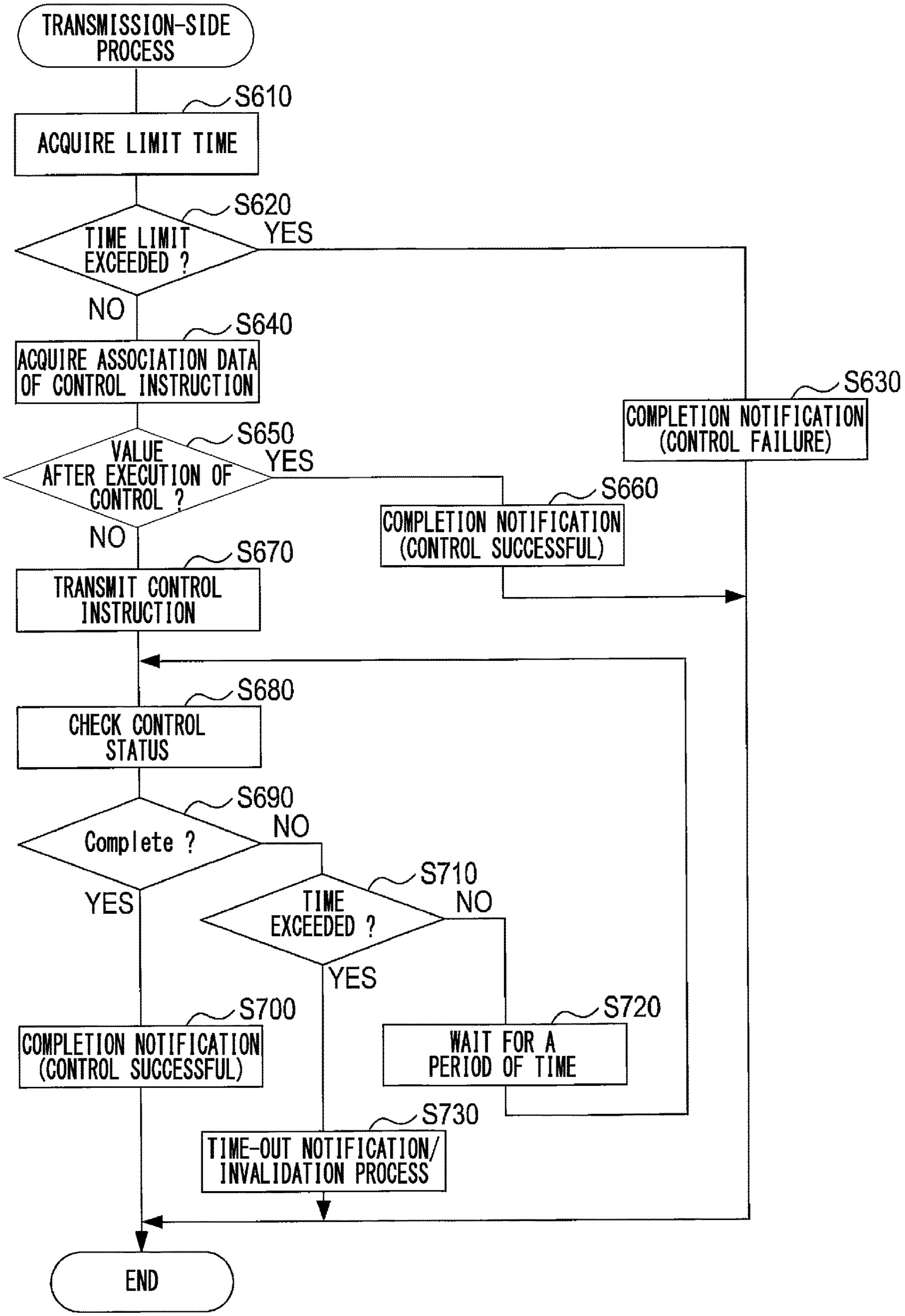
FIG. 31 is a flowchart of a transmission-side process executed by a transmission management unit.

The transmission-side processing executed by the transmission management unit 132 will be described with reference to a flowchart illustrated in FIG. 31. The transmission-side process is processing when the control instruction is extracted from the priority queue or the non-priority queue in S570 and transmitted to the edge device 2.

In S610, the transmission management unit 132 acquires the time limit information (that is, the time limit information illustrated in FIG. 23) included in the instruction information about the control instruction provided from the reception unit 131.

In subsequent S620, the transmission management unit 132 determines whether the current time exceeds the time limit indicated in the time limit information, and when the current time exceeds the time limit, the process proceeds to S630, and when the current time does not exceed the time limit, the process proceeds to S640. For example, there may be a case where the current time exceeds the limit time by taking time to be extracted from the non-priority queue. Note that, in the determination as to whether the current time exceeds the time limit, a time before the limit time by a time required for the control instruction to reach the vehicle from the management center 3 may be used. Further, a time before the limit time by a time required for the vehicle to complete execution of the control instruction may be used. That is, when the time required for the control instruction to reach the vehicle and the execution thereof is completed exceeds the time limit information, the process may proceed to S630.

Here, instead of the determination in the time limit information in S620, it may be determined whether the control has failed with a change in the vehicle state as the condition. For example, in a case where a condition of "the vehicle is stopped" is designated as the restriction information, it is determined whether the vehicle is still stopped with reference to the latest shadow 114 or the data with the latest time stamp among the data belonging to the standardized vehicle data. Then, when it is determined that the vehicle is stopped, the process may proceed to S640, and when it is determined that the vehicle is not stopped, the process may proceed to S630.

In S630, the transmission management unit 132 transmits a completion notification notifying the vehicle control API 148 of the request source that the control has failed, updates the control status of the control history memory unit 134 to control failure, and ends the process.

In S640, after transmitting the control instruction to the edge device 2, the transmission management unit 132 acquires the association data associated with the control instruction provided from the reception unit 131 from the shadow 114 of the target vehicle. After the control instruction is transmitted to the edge device 2, the association data may be acquired from the latest shadow 114 of the target vehicle after waiting for a predetermined time. The association data is data of the latest time stamp among the data belonging to the standardized vehicle data, and is data having a value corresponding to the state of the vehicle that changes before and after the execution of the control instruction. For example, when the control instruction is to unlock a door, vehicle data indicating a state of a key of the door to be unlocked is association data. For example, when the control instruction is to turn on the headlight, vehicle data indicating the state of the headlight to be turned on is the association data. The association data is vehicle data representing the state of the device to be controlled or the ECUs 210, 220, 230.

In subsequent S650, the transmission management unit 132 determines whether the association data has a value after the execution of the control. When the association data has the value after the execution of the control, the process proceeds to S660. When the association data has not the value after the execution of the control, the process proceeds to S670. Note that, in the case of a control instruction having no association data, the processing of S640 to S660 may be omitted.

In S660, the transmission management unit 132 transmits a completion notification notifying the vehicle control API 148 of the request source that the control is successful, updates the control status of the control history memory unit 134 to control success, and ends the process.

In S670, the transmission management unit 132 transmits the control instruction. That is, the MQTT message indicating the control instruction is published to the MQTT broker. At the same time, the transmission management unit 132 updates the control status of the control history memory unit 134 to "transmission completed".

In subsequent S680, the transmission management unit 132 checks the control status of the control history memory unit 134. That is, what is the status in which the latest timestamp is written among the control statuses is checked.

In subsequent S690, the transmission management unit 132 determines whether the control status is "Complete" indicating that the control instruction has normally reached the target vehicle. When the control status is "Complete", the process proceeds to S700, and when not "Complete", the process proceeds to S710.

In S700, the transmission management unit 132 transmits a completion notification notifying that the control is successful to the vehicle control API 148 serving as the request source, updates the control status of the control history memory unit 134 to control success, and ends the process.

In S710, the transmission management unit 132 determines whether the elapsed time from the transmission of the control instruction has been exceeded, and when the elapsed time has not been exceeded, the process proceeds to S720, and when the elapsed time has been exceeded, the process proceeds to S730. Note that the determination as to whether the time has been exceeded is made based on whether a preset allowable time (for example, 10 minutes) has been exceeded. Note that the allowable time may be set based on time limit information designated at the time of the vehicle control request.

In S720, the transmission management unit 132 waits for a preset certain time (for example, 1 minute), and then returns the process to S680.

In S730, the transmission management unit 132 returns the timeout notification to the vehicle control API 148 that is the request source, and updates the control status of the control history memory unit 134 to abnormal termination due to timeout. Further, the transmission management unit 132 invalidates the MQTT message corresponding to the control instruction and ends the process. That is, the transmission management unit 132 performs the invalidation process to notify the vehicle that the vehicle does not need to execute the control instruction already transmitted to the vehicle.

Note that the invalidation process may be omitted, and the service user who has received the timeout notification may be left to determine whether to execute control corresponding to the invalidation process. That is, for example, when a vehicle control request for turning on the light is input from the vehicle control API 148 but a timeout notification is returned, the service user may leave the vehicle control request as it is or may input a vehicle control request for turning off the light from the vehicle control API 148 just in case.

[3-5-3. Reception-Side Process]

Figure 32:
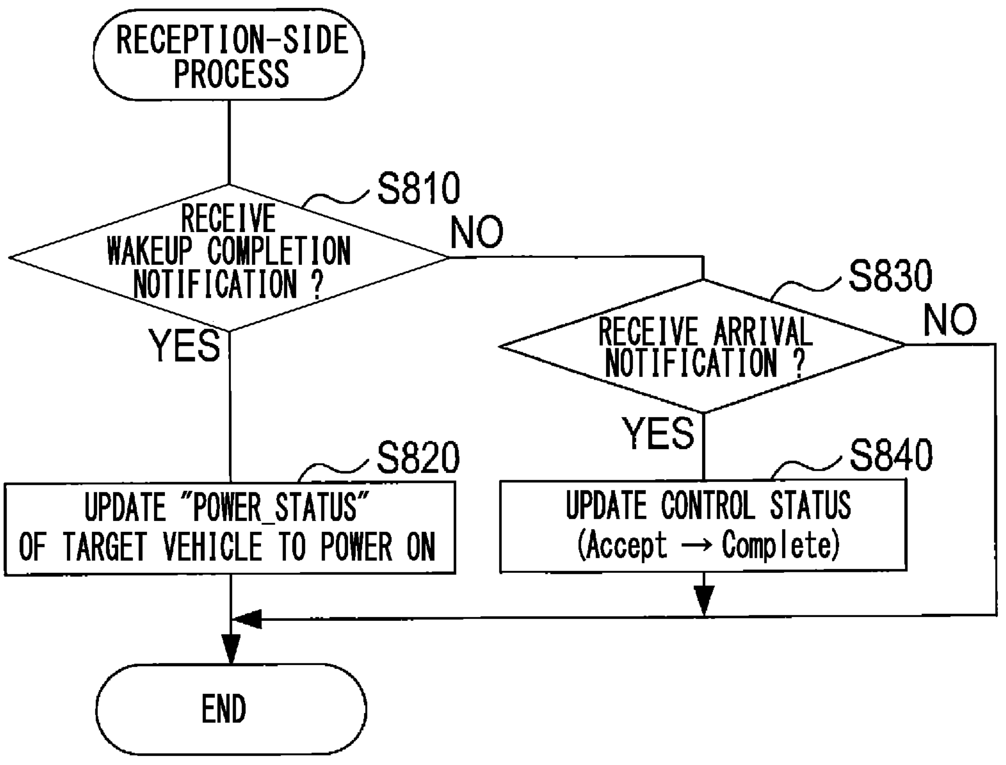
FIG. 32 is a flowchart of a reception-side process executed by a reception management unit.

The reception-side process executed by the reception management unit 133 will be described with reference to a flowchart illustrated in FIG. 32. This process is repeatedly executed.

In S810, the reception management unit 133 determines whether a wake-up completion notification has been received in response to the wake-up instruction transmitted in the previous S430. When the wake-up completion notification has been received, the process proceeds to S820. When the wake-up completion notification has not been received, the process proceeds to S830.

In S820, the reception management unit 133 updates "power_status" of the shadow 114 of the target vehicle to be powered on, and ends the process. In response to this update, an affirmative determination is made in the previous determination in S420.

In S830, the reception management unit 133 determines whether the arrival notification has been received with respect to the control instruction transmitted in the previous S670, and when the arrival notification has been received, the process proceeds to S840, and when the arrival notification has not been received, the process ends.

In S840, the reception management unit 133 updates the control status of the history data stored in the control history memory unit 134 from "Accept" to "Complete" for the control instruction that is the target of the arrival notification, and completes the processing. In response to this update, an affirmative determination is made in the previous determination in S690.

As illustrated in FIG. 25, the edge device 2 includes a wake-up control unit 201 and an instruction execution unit 202.

The wake-up control unit 201 manages the power state of the vehicle on which the edge device 2 is mounted. The power supply state of the vehicle includes a low power consumption sleep state in which some functions are stopped and a wake-up state in which all functions are activated. When receiving a wake-up instruction addressed to the host vehicle from the management center 3 while the host vehicle is in the sleep state, the wake-up control unit 201 shifts the power state of the edge device 2 to the wake-up state to transmit a wake-up completion notification to the management center 3.

The instruction execution unit 202 operates when the power supply state of the host vehicle is the wake-up state. The instruction execution unit 202 performs authentication by collating the vehicle authentication information attached to the control instruction with the vehicle authentication information included in the host vehicle, and when the authentication is successful, the instruction execution unit itself executes the control indicated by the control instruction or causes the corresponding electronic control device to execute the control. When the authentication fails, the instruction execution unit 202 transmits a response indicating the failure to the management center 3, and when the control is executed, the instruction execution unit transmits a control result to the management center 3.

[3-6. Operation Example]

An operation example of the vehicle control unit 130 will be described.

First, a typical operation in a case where the power supply state of the edge device 2 of the target vehicle is the wake-up state will be described with reference to FIG. 33. Note that "pwer_status" of the shadow 114 of the target vehicle is "power on" reflecting the power state of the edge device 2 of the target vehicle.

The reception unit 131 registers history data of control instructions in the control history memory unit 134 as indicated by an arrow L51. By the registration of the history data, the control status of the history data is set to "Accept". In addition, the reception unit 131 transmits a control instruction to the transmission management unit 132 as indicated by an arrow L52.

Upon receiving the control instruction, the transmission management unit 132 checks "power_status" of the shadow 114 of the target vehicle as indicated by an arrow L53. Since "pwer_status" is "power on", the transmission management unit 132 transmits the control instruction to the target vehicle as indicated by an arrow L54. Thereafter, the transmission management unit 132 periodically checks the control status of the history data as indicated by an arrow L55.

The target vehicle that has received the control instruction returns an arrival notification indicating that the control instruction has been normally received to the management center 3 as indicated by an arrow L56.

Upon receiving the arrival notification, the reception management unit 133 updates the control status of the history data from "Accept" to "Complete" as indicated by an arrow L57.

When the transmission management unit 132 confirms that the control status has changed to "Complete" by the periodic confirmation of the history data, as indicated by an arrow L58, the transmission management unit transmits a completion notification indicating that the control instruction has been normally completed to the vehicle control API 148 of the request source.

Next, an operation when the control instruction is transmitted to the target vehicle but the arrival notification is not returned from the target vehicle will be described with reference to FIG. 34.

Figure 33:
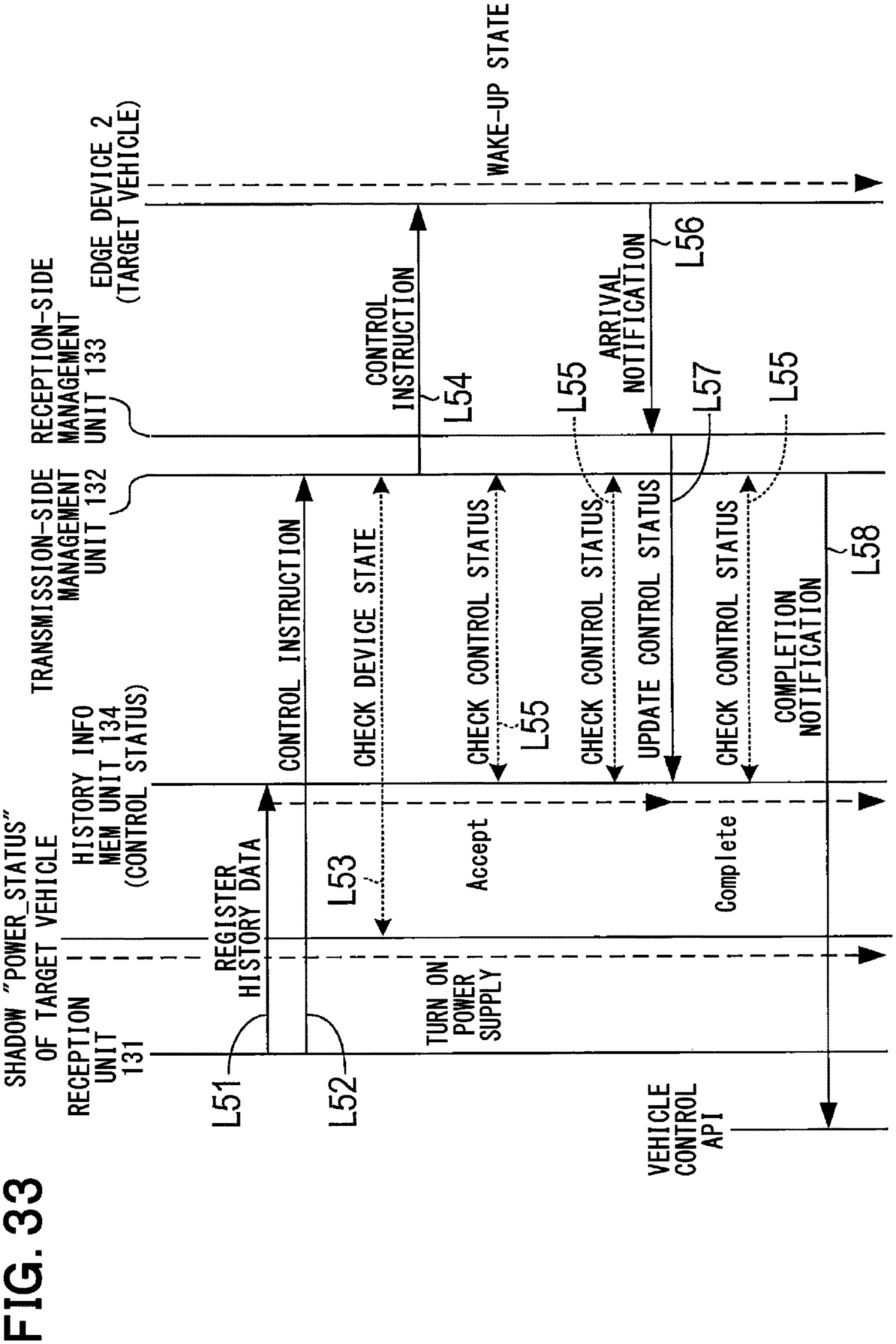

Note that, as indicated by arrows L51 to L55, the content from when the reception unit 131 registers the history data to when the transmission management unit 132 transmits a control instruction to the target vehicle and starts periodic monitoring of the history data is similar to the content illustrated in FIG. 33.

After transmitting the control instruction to the target vehicle, when the control status of the history data remains "Accept" even after the time limit indicated by the time limit information or the preset allowable time has elapsed, the transmission management unit 132 transmits a timeout notification indicating abnormal termination to the request source vehicle control API 148 as indicated by an arrow L59.

Figure 35:
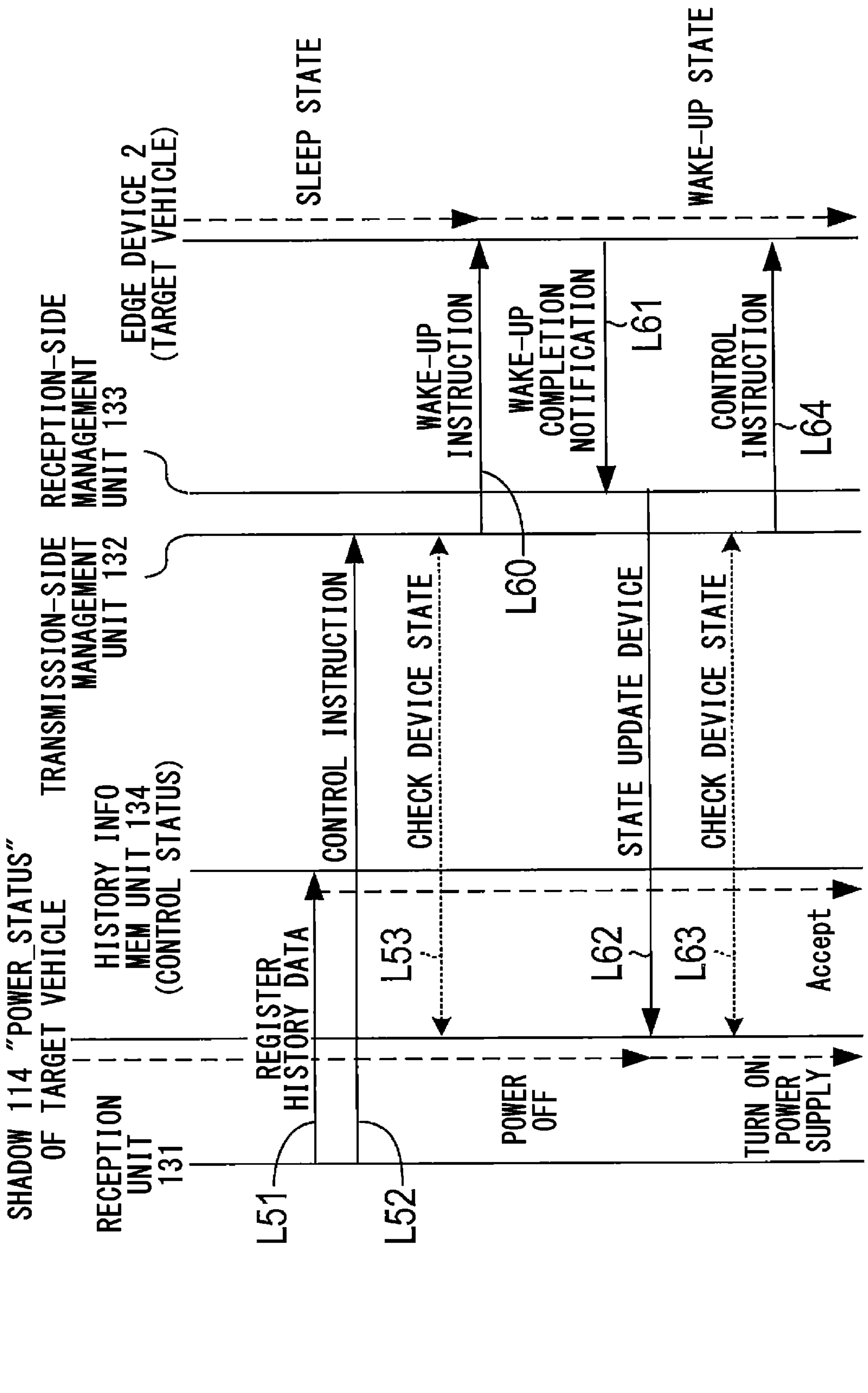
FIG. 35 is a sequence diagram illustrating an operation when a power state of a vehicle as a target of a vehicle control request is turned off.

Next, an operation when the power supply state of the edge device 2 of the target vehicle is the sleep state will be described with reference to FIG. 35. Note that "pwer_status"

of the shadow 114 of the target vehicle is "power off" reflecting the power state of the edge device 2 of the target vehicle. Further, as indicated by arrows L51 to L53, the content from when the reception unit 131 registers the history data to when the transmission management unit 132 checks "power_status" of the shadow 114 of the target vehicle is similar to the content in the content illustrated in FIG. 33.

Since "pwer_status" of the shadow 114 of the target vehicle checked by the transmission management unit 132 is "power off", the transmission management unit 132 transmits a wake-up instruction to the target vehicle as indicated by an arrow L60. Thereafter, the transmission management unit 132 periodically checks "power_status" of the target vehicle.

The target vehicle that has received the wake-up instruction shifts the power supply state of the edge device 2 from the sleep state to the wake-up state, and returns a wake-up completion notification to the management center 3 as indicated by an arrow L61.

Upon receiving the wake-up completion notification, the reception management unit 133 updates "power_status" of the shadow 114 of the target vehicle to "power on" as indicated by an arrow L62.

When the transmission management unit 132 confirms that the "power_status" of the edge device 2 of the target vehicle has changed to "power on" by the periodic confirmation as indicated by an arrow L63, the transmission management unit transmits a control instruction to the target vehicle as indicated by an arrow L64.

Figure 34:
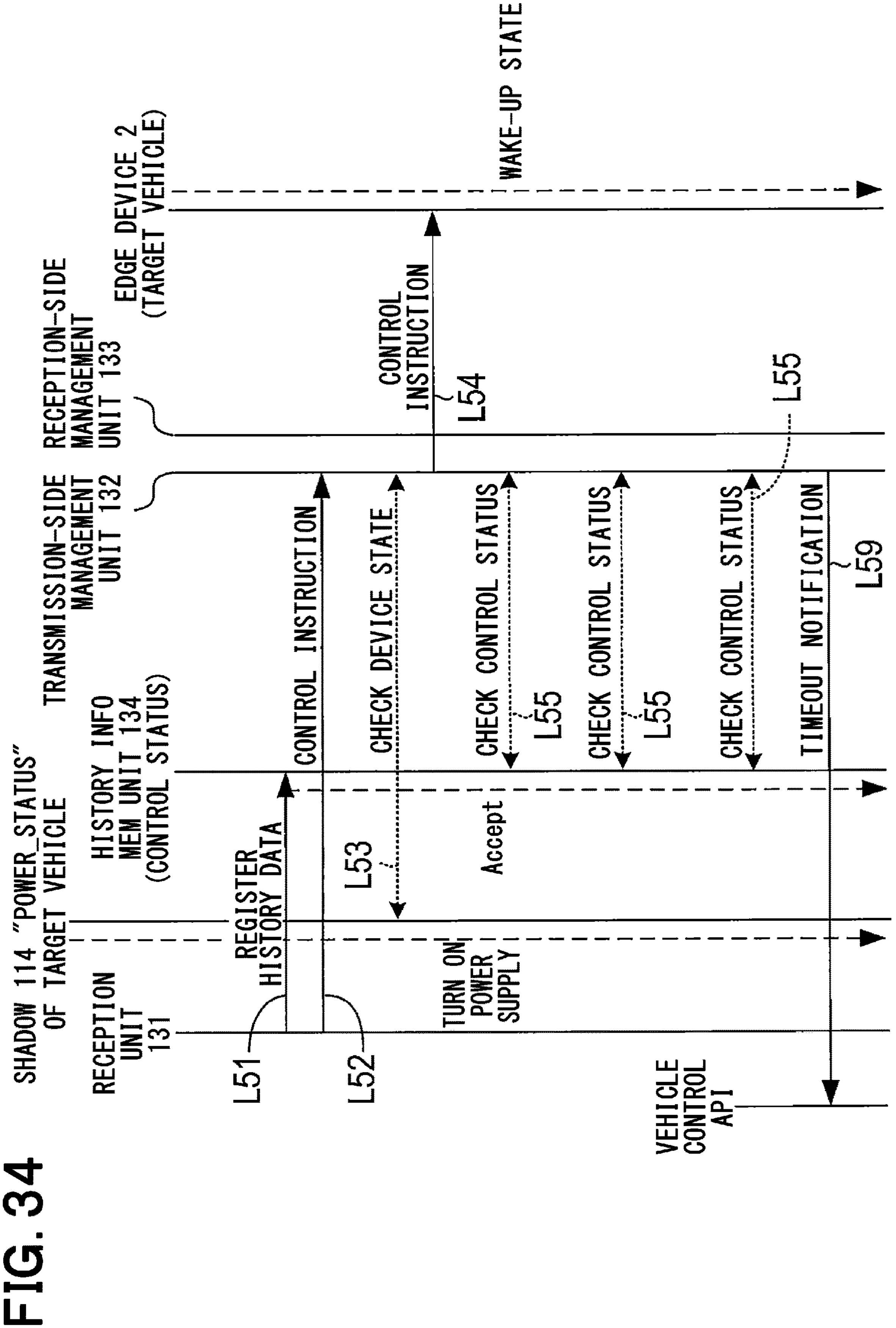
FIG. 34 is a sequence diagram illustrating an operation in a case where there is no response to the control instruction from the vehicle.

The subsequent operation is similar to the content indicated by arrows L55 to L59 in FIGS. 33 and 34.

4. Correspondence of Terms

In the embodiment described above, the mobility IoT system 1 corresponds to a mobility service providing system, the management center 3 corresponds to a mobility service base server, and the edge device 2 corresponds to an in-vehicle device. The shadow management unit 112 corresponds to a first database, and the data management unit 121 corresponds to a second database. The API providing unit 122 corresponds to an interface unit. The processing of S230 corresponds to a history registration unit, the processing of S310 to S340 corresponds to an order control unit, and the processing of S510 to S570 corresponds to a priority processing unit. The processing of S610 to S620 corresponds to a pre-transmission determination unit. The processing of S680 to S700 and S720 corresponds to a delivery confirmation unit, the processing of S710 and S730 corresponds to an invalidation unit, and the processing of S630 and S830 to S840 corresponds to a history update unit. The control status "Accept" corresponds to the acceptance state, "Complete" corresponds to the completion state, and the vehicle control request corresponds to the access request.

5. Effects

According to the embodiment described in detail above, the following effects are obtained.

(5a) In the mobility IoT system 1, the vehicle control request includes priority information, and a control instruction generated from the vehicle control request is transmitted to the vehicle with priority given to a control instruction set with a high priority. Therefore, even in a situation where many control instructions are accumulated in the management center 3, it is possible to complete transmission of a control instruction with a high priority with a small delay.

(5b) In the mobility IoT system 1, each control instruction realizes one independent control, and an order ID using a serial number is assigned to each control instruction. The vehicle that receives the control instruction executes the control in the order according to the serial number indicated by the order ID. Therefore, even when the order of the control instruction to reach the vehicle is changed due to the influence of the communication environment between the management center 3 and the vehicle (that is, the edge device 2), the vehicle can execute the control in the order intended by the request source of the vehicle control request. As a result, safety and reliability of vehicle control based on an instruction from the management center 3 can be improved. For example, in a series of control that is required to be executed with strict order, there is a possibility of completely different control or meaningless control by switching the order of control, but it is possible to suppress the occurrence of such a situation.

(5c) In the mobility IoT system 1, after transmitting the control instruction to the vehicle, the control status is repeatedly checked. Then, in a case where the status changes to a status indicating that there is a response from the vehicle, a completion notification is returned to the request source of the vehicle control request, and in a case where there is no change in the status even after the allowable time is exceeded, a timeout notification is returned to the request source of the vehicle control request. Therefore, according to the mobility IoT system 1, it is possible to notify the request source of the vehicle control request that the control instruction has reached the vehicle and that the control instruction has not reached the vehicle within the allowable time. As a result, the request source of the vehicle control request can take an appropriate measure according to the success or failure of the arrival of the control instruction.

(5d) In the mobility IoT system 1, when the control cannot be ended by the limit time even when the control instruction reaches the vehicle, the request source of the vehicle control request is notified of the control failure without transmitting the control instruction. Furthermore, before transmitting the control instruction, the mobility IoT system 1 refers to the shadow 114 of the target vehicle to check the association data associated with the control instruction. Then, when the association data is the value after the execution of the control, the request source of the vehicle control request is notified that the control has succeeded without transmitting the control instruction. Therefore, according to the mobility IoT system 1, since unnecessary transmission of a control instruction is suppressed, the communication amount between the management center 3 and the vehicle can be reduced.

(5e) The mobility IoT system 1 checks "power_status" of the target vehicle by referring to the shadow 114 of the target vehicle before transmitting the control instruction to transmit a wake-up instruction when the power is turned off. That is, the control instruction is transmitted after the target vehicle is shifted to a state where the control instruction can be executed. Therefore, in the mobility IoT system 1, even when the engine of the target vehicle is off, the target vehicle can be activated to execute control.

6. Other Embodiments

Although one embodiment of the present disclosure has been described above, the present disclosure is not limited to the above embodiment, and various modifications can be made.

(6a) In the present disclosure, the history data is stored in the control history memory unit 134 in units of control instructions, but may be stored in units of vehicle control requests (that is, a request unit from the vehicle control API 148).

(6b) In the present disclosure, the vehicle control unit 130 is configured to return the response from the edge device 2 to the control instruction as it is to the requesting vehicle control API 148 as the request source in units of control instructions. The present disclosure is not limited thereto, and may be configured such that, in a case where a plurality of control instructions is generated from one vehicle control request, responses from the edge device 2 to the control instructions are collectively returned to the vehicle control API 148 as the request source in units of vehicle control requests.

(6c) In the present disclosure, the edge device 2 transmits a response to the management center 3 when the execution of the control content is completed in response to the control instruction from the management center 3, but may transmit a response to the management center 3 when the control instruction is received.

(6d) The control unit 31 and the method thereof described in the present disclosure may be realized by a dedicated computer provided by configuring a processor and a memory programmed to execute one or a plurality of functions embodied by a computer program. Alternatively, the control unit 31 and the method thereof described in the present disclosure may be realized by a dedicated computer provided by configuring a processor by one or more dedicated hardware logic circuits. Alternatively, the control unit 31 and the method thereof described in the present disclosure may be realized by one or more dedicated computers configured by a combination of a processor and a memory programmed to execute one or more functions and a processor configured by one or more hardware logic circuits. Furthermore, the computer program may be stored in a computer-readable non-transition tangible recording medium as an instruction executed by a computer. The method for realizing the functions of the units included in the control unit 31 does not necessarily include software, and all the functions may be realized using one or a plurality of pieces of hardware.

(6e) A plurality of functions of one component in the above embodiment may be implemented by a plurality of components, or one function of one component may be implemented by a plurality of components. A plurality of functions of a plurality of components may be implemented by one component, or one function realized by a plurality of components may be implemented by one component. Part of the configuration of the above embodiment may be omitted. At least part of the configuration of the above embodiment may be added to or replaced with the configuration of another above embodiment.

(6f) In addition to the management center 3 described above, the present disclosure can be implemented in various forms such as a system including the management center 3 as a component, a program for causing a computer to function as the management center 3, a non-transitory tangible recording medium such as a semiconductor memory in which the program is recorded, and a vehicle access control method.

What is claimed is:

1. A mobility service base server comprising:

a first database that stores a plurality of shadows, each of the plurality of shadows being generated for a vehicle based on vehicle data provided from an in-vehicle device mounted on the vehicle and representing a state of the vehicle at a specific time;

a service-side unit including a second database storing an index corresponding to each of the shadows accumulated in the first database and having information to be used for searching for each shadow, and an interface unit configured to receive an access request from an external device outside of the mobility service base server; and a unit configured to perform searching for the plurality of shadows accumulated in the first database by using an index, the unit including the first database and the interface unit;

wherein:

the unit further includes a vehicle control unit configured to execute, when the interface unit receives the access request for the vehicle, access to a target vehicle, the target vehicle being a vehicle to be accessed, by performing wireless communication with the in-vehicle device mounted on the target vehicle, and to execute relay control in response to a control instruction transmitted to and received from the in-vehicle device; and the vehicle control unit includes:

a control history memory unit that stores content and a control status of the control instruction to be transmitted to the vehicle;

a history registration unit that registers the control instruction in the control history memory unit with the control status set to an acceptance state;

a delivery confirmation unit that confirms delivery of the control instruction by monitoring the control status after transmission of the control instruction; and a history update unit that, upon receipt of a response from the in-vehicle device to the control instruction, updates the control status of the control instruction in the control history memory unit to a completion state.

2. The mobility service base server according to claim 1, wherein:

the vehicle control unit further includes an invalidation unit that invalidates the control instruction when the delivery of the control instruction is not confirmed by the delivery confirmation unit within a preset allowable time.

3. The mobility service base server according to claim 1, wherein the vehicle control unit includes an order control unit that assigns, to a series of the control instructions for which order control is required, a serial number indicating an execution order of control.

4. A mobility service providing system comprising:

an in-vehicle device mounted on a vehicle; and a mobility service base server that provides a mobility service to the vehicle on which the in-vehicle device is mounted;

wherein:

the mobility service base server includes:

a first database that stores a plurality of shadows each generated for each vehicle based on vehicle data provided from the in-vehicle device mounted on a vehicle, the plurality of shadows each representing a state of the vehicle at a specific time;

an interface unit configured to receive an access request from an external device outside the mobility service base server; and a unit configured to perform searching for the plurality of shadows accumulated in the first database by using an index, the unit including the first database and the interface unit;

the unit further includes a vehicle control unit configured, when the interface unit receives the access request for the vehicle, to execute access to a target vehicle, the target vehicle being the vehicle to be accessed, by performing wireless communication with the in-vehicle device mounted on the target vehicle, and to execute relay control in response to a control instruction transmitted to and received from the in-vehicle device; and the vehicle control unit includes:

a control history memory unit configured to store content and a control status of the control instruction to be transmitted to the vehicle;

a history registration unit configured to register the control instruction in the control history memory unit with the control status set to an acceptance state;

a delivery confirmation unit configured, after transmission of the control instruction, to confirm delivery of the control instruction by monitoring the control status; and a history update unit configured, upon receipt of a response from the in-vehicle device to the control instruction, to update the control status of the control instruction in the control history memory unit to a completion state.

5. The mobility service providing system according to claim 4, wherein:

the vehicle control unit is configured to execute relay control in response to a control instruction transmitted to and received from the in-vehicle device, and is configured to transmit a specific control instruction that defines, including control timing of each instruction, a series of instructions for a target device, which is an in-vehicle device to be controlled mounted on the target vehicle; and the in-vehicle device is configured, when receiving the specific control instruction, to output, to the target device, individual instructions included in the series of instructions indicated in the specific control instruction, one by one sequentially in accordance with the control timing.

6. The mobility service providing system according to claim 5, wherein:

the vehicle control unit includes an order control unit configured to assign, to a series of the control instructions requiring order control, a serial number indicating an execution order; and the in-vehicle device is configured to execute the control instructions received from the mobility service base server in order of the serial numbers assigned to the control instructions.

7. The mobility service providing system according to claim 4, wherein the vehicle control unit includes an invalidation unit configured to invalidate the control instruction when the delivery confirmation unit does not confirm delivery of the control instruction within a preset allowable time.

8. The mobility service providing system according to claim 4, wherein the vehicle control unit includes an order control unit configured to assign, to a series of the control instructions requiring order control, a serial number indicating an execution order.

9. A non-transitory computer-readable storage medium storing a program for causing a computer constituting a mobility service base server, together with a first database that stores a plurality of shadows each generated for each vehicle based on vehicle data provided from an in-vehicle device mounted on a vehicle and representing a state of the vehicle at a specific time, and an interface unit configured to receive an access request from an external device outside the mobility service base server, to function as a vehicle control unit configured, when the interface unit receives the access request for the vehicle, to execute access to a target vehicle, the target vehicle being the vehicle to be accessed, by performing wireless communication with the in-vehicle device mounted on the target vehicle, and to execute relay control in response to a control instruction transmitted to and received from the in-vehicle device, wherein the vehicle control unit includes:

a control history memory unit configured to store content and a control status of the control instruction to be transmitted to the vehicle;

a history registration unit configured to register the control instruction in the control history memory unit with the control status set to an acceptance state;

a delivery confirmation unit configured, after transmission of the control instruction, to confirm delivery of the control instruction by monitoring the control status; and a history update unit configured, upon receipt of a response from the in-vehicle device to the control instruction, to update, in the control history memory unit, the control status of the control instruction to a completion state.

* * * * *